United States Patent
Brown et al.

(10) Patent No.: US 12,359,456 B2
(45) Date of Patent: Jul. 15, 2025

(54) MONITORING AND CONTROLLING CONNECTED POOL DEVICES

(71) Applicant: Pentair Water Pool and Spa, Inc., Cary, NC (US)

(72) Inventors: Edward Brown, Thousand Oaks, CA (US); Gerry Callahan, Smithfield, NC (US)

(73) Assignee: Pentair Water Pool and Spa, Inc., Cary, NC (US)

( * ) Notice: Subject to any disclaimer, the term of this patent is extended or adjusted under 35 U.S.C. 154(b) by 830 days.

(21) Appl. No.: 17/304,162

(22) Filed: Jun. 15, 2021

(65) Prior Publication Data

US 2021/0388627 A1 Dec. 16, 2021

Related U.S. Application Data

(60) Provisional application No. 62/705,185, filed on Jun. 15, 2020.

(51) Int. Cl.
*E04H 4/12* (2006.01)
*A61H 33/00* (2006.01)
(Continued)

(52) U.S. Cl.
CPC ......... *E04H 4/1281* (2013.01); *A61H 33/005* (2013.01); *A61H 33/0095* (2013.01); *E04H 4/129* (2013.01); *F04B 49/02* (2013.01); *F04B 49/065* (2013.01); *F04B 49/20* (2013.01); *G05B 15/02* (2013.01); *G08B 21/18* (2013.01); *A61H 2033/0079* (2013.01); *A61H 2201/5082* (2013.01); *G05D 21/02* (2013.01)

(58) Field of Classification Search
CPC ..... E04H 4/1281; E04H 4/129; A61H 33/005; A61H 33/0095; A61H 2033/0079; A61H 2201/5082; F04B 49/02; F04B 49/065; F04B 49/20; G05B 15/02; G08B 21/18; G05D 21/02
USPC .................... 210/167.11, 143, 739, 742, 744
See application file for complete search history.

(56) References Cited

U.S. PATENT DOCUMENTS

| 3,804,253 A | 4/1974 | Harrell et al. |
| 5,559,720 A * | 9/1996 | Tompkins .......... A61H 33/0095 |
| | | 700/282 |

(Continued)

FOREIGN PATENT DOCUMENTS

WO WO-2018193263 A1 * 10/2018 .............. C02F 1/008

OTHER PUBLICATIONS

International Search Report and Written Opinion, International Application No. PCT/US2021/070714, dated Dec. 6, 2021, 19 pages.

(Continued)

*Primary Examiner* — Fred Prince
(74) *Attorney, Agent, or Firm* — Husch Blackwell LLP

(57) ABSTRACT

A system and methods of remotely monitoring and controlling a pool controller for a pool or a spa via one or more remote computing devices is provided. In some embodiments, a remote user can be provided with information about the pool or the spa. The remote user is provided with an ability to remotely optimize a performance of the pool or the spa, including remotely adjusting a chemistry of the pool or the spa, remotely activating a heater of the pool or the spa, and/or remotely activating a pump of the pool or the spa.

19 Claims, 11 Drawing Sheets

(51) Int. Cl.
*F04B 49/02* (2006.01)
*F04B 49/06* (2006.01)
*F04B 49/20* (2006.01)
*G05B 15/02* (2006.01)
*G05D 21/02* (2006.01)
*G08B 21/18* (2006.01)

(56) References Cited

U.S. PATENT DOCUMENTS

| | | | |
|---|---|---|---|
| 6,238,555 B1* | 5/2001 | Silveri | C02F 1/4674 |
| | | | 210/243 |
| 7,752,893 B2* | 7/2010 | Biberger | G01N 33/18 |
| | | | 73/61.41 |
| 2005/0137118 A1 | 6/2005 | Silveri | |
| 2017/0215261 A1* | 7/2017 | Potucek | H05B 47/105 |
| 2019/0149353 A1* | 5/2019 | Khalid | H04W 4/80 |
| | | | 455/420 |
| 2019/0374431 A1* | 12/2019 | Laflamme | A61H 33/0095 |
| 2020/0135000 A1* | 4/2020 | Asiri | G08B 21/084 |

OTHER PUBLICATIONS

International Preliminary Report on Patentability issued for International Application No. PCT/US2021/070714, dated Dec. 13, 2022, 11 pages.

* cited by examiner

MONITORING AND CONTROLLING CONNECTED POOL DEVICES

CROSS-REFERENCE TO RELATED APPLICATIONS

The present application claims priority to U.S. Patent Application No. 62/705,185, filed Jun. 15, 2020. U.S. Patent Application 62/705,185 is hereby fully incorporated by reference as if set forth fully herein.

BACKGROUND

Water supplied to a home or a business, whether through a well or a municipal water supply, may be used in a variety of applications, such as drinking, cooking, showers, baths, toilets, pools, agricultural maintenance, and even heat.

Many homes and businesses may be equipped with water-related devices as well as chemical controllers, pumps, heaters, and skimmers for pools. Conventionally, such water-related devices may include or be connected to one or more controllers through which a user may manually or automatically operate these devices. However, when away from his or her home or business, a person is generally unable to monitor or control these devices, even if there is a wish to control chemical balances or temperatures of a pool from a variety of locations in, around, and outside of the home. For example, a homeowner is unable to remotely instruct a conventional chemical controller for his or her pool to operate less frequently in his or her absence, to be informed if an animal or an object enters his or her pool, or to monitor a temperature of the pool. Additionally, a conventional controller may not be advanced enough to protect the homeowner from unsafe operational scenarios and may be bulky or require an electrician for installation due to high voltage connections.

SUMMARY

In light of the deficiencies described above, new systems and methods for providing individuals with an ability to monitor and control a status of a pool in a home or a business and to optimize a performance of the pool are desirable.

In one embodiment, a method of remotely monitoring and controlling a pool controller for a pool or a spa is provided. The method can include receiving pool chemistry data from a chemical controller or a chemical sensor, outputting the pool chemistry data to a user device, receiving a selection to adjust a chemistry of the pool or the spa from the user device, receiving chemical level data from the chemical controller, determining whether a chemical level in the chemical controller is low based on the chemical level data. When the chemical level in the chemical controller is low, the method further includes the steps of instructing the chemical controller to adjust the chemistry of the pool or the spa, sending a first alert to the user device indicating that chemicals have been added to the pool or the spa, and sending a second alert to the user device indicating that the pool or the spa can be used safely.

The method can further include requesting the chemical level data from the chemical controller prior to receiving the chemical level data from the chemical controller.

The method can further include instructing the chemical controller to rebalance the chemistry of the pool or the spa.

The method can further include instructing the chemical controller to rebalance the chemistry of the pool or the spa a predetermined period of time after instructing the chemical controller to adjust the chemistry of the pool or the spa.

The method can further include sending the second alert to the user device after instructing the chemical controller to rebalance the chemistry of the pool or the spa.

The method can further include sending a low chemical alert to the user device when the chemical level in the chemical controller is low.

The method can further include determining whether an automatic chemical supply request has been enabled, retrieving service provider information, and contacting a corresponding service provider based on the service provider information.

The method can further include communicating with a gateway, a network, and/or a remote server to output the pool chemistry to the user device.

The method can further include communicating with a gateway or a network to send the first alert to the user device and to send the second alert to the user device.

In one embodiment, t a method of remotely monitoring and controlling a pool controller for a pool or a spa is provided. The method can include receiving a temperature value from a temperature sensor, outputting the temperature value to a user device, receiving a new target pool temperature from the user device, and selectively activating a heater and/or a pump in order to heat or cool the pool or the spa to the new target pool temperature.

In the method, the temperature sensor can be configured to measure an ambient temperature value around the pool or the spa.

In the method, the temperature sensor can be in fluid contact with the pool or the spa.

The method can further include sensing a pump type of the pump.

The method can further include selectively activating the pump by turning the pump on and off when the pump type is single speed.

The method can further include receiving a pump speed from the user device, and selectively activating the pump to run at the pump speed when the pump type is variable speed.

The method can further include receiving the pump speed from the user device via a remote server.

The method can further include receiving a desired flow rate from the user device, and selectively activating the pump to run at the desired flow rate when the pump type is variable speed.

The method can further include receiving the desired flow rate from the user device via a remote server.

The method can further include communicating with a gateway, a network, and/or a remote server to output the temperature value to the user device.

The method can further include receiving the new target pool temperature from the user device via a remote server.

In one embodiment, the invention can provide a method of remotely monitoring and controlling a pool controller for a pool or a spa. The method can include receiving a pump speed or a desired flow rate from a user device, and selectively activating a pump to run at the pump speed or the desired flow rate.

DESCRIPTION OF THE DRAWINGS

The invention will be better understood and features, aspects, and advantages other than those set forth above will become apparent when consideration is given to the following detailed description. Such detailed description makes reference to the following drawings.

DETAILED DESCRIPTION

Figure 1:
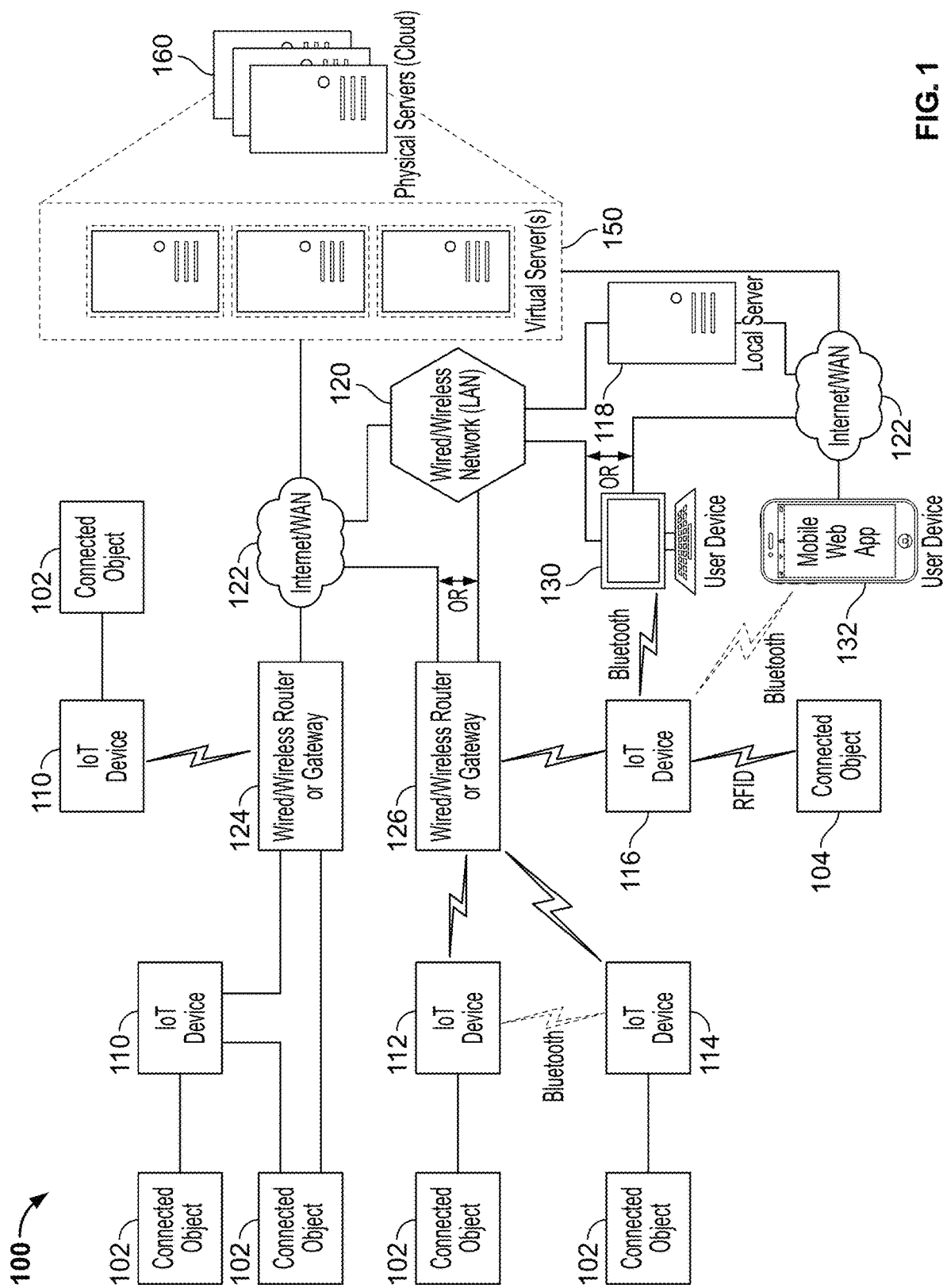
FIG. 1 is a block diagram of an example computing environment for deploying Internet of Things (IoT) devices in accordance with various embodiments.

Before any embodiments are described in detail, it is to be understood that the invention is not limited in its application to the details of construction and the arrangement of components set forth in the following description or illustrated in the following drawings, which is limited only by the claims that follow the present disclosure. The invention is capable of other embodiments, and of being practiced, or of being carried out, in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following description is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. Skilled artisans will recognize the examples provided herein have many useful alternatives and fall within the scope of embodiments of the invention.

Additionally, while the following discussion may describe features associated with specific devices, it is understood that additional devices and/or features can be used with the described systems and methods, and that the discussed devices and features are used to provide examples of possible embodiments, without being limited.

FIG. 1 illustrates an example computing environment 100 for wired and/or wireless monitoring and control of electronic and mechanical devices that are deployed in a physical environment, such as a home or residential environment, a commercial environment, such as a commercial building, and any other physical environment where it is feasible and beneficial to deploy so-called "smart" devices, which are natively or retroactively enabled to connect to the internet or another wide-area network (WAN) 122 to send and receive electronic data. In particular, such devices become "connected objects" 102, 104 in the computing environment 100 by interfacing with one or more internet enabled devices, referred to herein as an "Internet-of-Things" (IoT) device (e.g., devices 110, 112, 114, 116) in accordance with various embodiments described herein. Other significant entities, such as a person, an animal (e.g., a farm animal), a pipe or a pipeline, a body of water, or the physical environment itself, may also become a connected object 102, 104 in the computing environment 100 by interfacing with one of more of the IoT devices 110, 112, 114, 116. The interface or connection between a connected object 102, 104 and an IoT device 110, 112, 114, 116 may depend on several factors, non-limiting examples of which can include: whether a connected object 102, 104 is electronic, mechanical, organic, etc.; whether a connected object 102, 104 is "natively" connected, having an IoT device 110, 112, 114, 116 or another transmitter built-in, such as "smart sensors" that can be WiFi-enabled, or an IoT device 110, 112, 114, 116 is added or connected to that connected object 102, 104 to make that object "connected;" whether an IoT device 110, 112, 114, 116 connects directly to a connected object 102, 104 and/or connects to other objects or must be disposed in a particular location (e.g., to deploy a sensor); and whether an IoT device 110, 112, 114, 116 sends data to a connected object 102, 104, receives data from a connected object 102, 104, or both. Example interfaces and connections are described below with respect to FIG. 1, FIG. 2A, and FIG. 2B.

Each of the IoT devices 110, 112, 114, 116 may be embedded with electronics, software, sensors, actuators, and network connectivity, either within the device itself or in cooperation with connected servers 118, 160, which may enable the IoT device and the embedded software to collect and exchange data. In some embodiments, various IoT devices in the computing environment 100 may send and/or receive data transmissions over the WAN 122, a local area network (LAN) 120, and/or another communication network using any suitable communication protocol. For example, the IoT devices 112, 114, 116 may communicate over the LAN 120 with a local server computing device 118, such as in a private network where transmitted data to and/or from the IoT devices 112, 114, 116 is isolated from the internet or the WAN 122, at least until the transmitted data is processed by the local server computing device 118. In some embodiments, the local server computing device 118 may be operated at the same location as the IoT devices 112, 114, 116, such as at a residence or in an office building. A local user device 130 may also be connected to the LAN 120 in order to access IoT data as described below. Alternatively, IP connectivity may be used, connecting the LAN 120 and/or the local server computing device 118 to the internet or the WAN 122 so that the local user device 130 and/or a remote user device 132 can access the local server computing device 118.

In still other embodiments, one or more of the IoT devices 110, 112, 114, 116 may connect directly or through a router, a gateway, a base station, etc. (shown as a wired/wireless router or gateway 124, 126) to the WAN 122 in order to communicate with cloud-based computing resources. Such an environment provides a bi-directional, direct-to-cloud communication between the IoT devices 110, 112, 114, 116 and one or more application and/or hosting servers. In some embodiments, the IoT devices 110, 112, 114 116 may communicate with and directly use the resources of one or more physical, remote server computing devices 160, which may be deployed in one or more data centers, for example, in a particular geographic location or dispersed throughout several geographic locations. In some embodiments, the physical, remote server computing devices 160 may be cloud-based and cooperate to provide virtualized computing resources that can be allocated for use by, for example, an authorized user of a computing resource service provider. Thus, a user that controls or provides services for the IoT devices 110, 112, 114, 116 may configure and deploy one or more virtual servers 150 that are allocated usage of certain physical computing resources, such as processor cycles, memory, data storage, etc., of the physical, remote server computing devices 160. The IoT devices 110 112, 114, 116 may, in turn, be configured to connect to the virtual servers 150. For example, the IoT device 110 may be programmed to connect to an IP address associated with an endpoint that connects a virtual network adapter of the virtual servers 150 to a physical network adapter of the physical, remote server computing devices 160. The virtual servers 150 or the computing resource service provider's computing environment in which the virtual servers 150 are deployed may provide other computing resource services for implementing an IoT platform as described further below.

Given this bi-directional, cloud-based environment, the IoT devices 110, 112, 114, 116 may be deployed as direct-to-cloud IoT devices. In other words, deploying multiple ones of the IoT devices 110, 112, 114, 116 in a LAN-based or cloud-based environment may provide for an internet-working of physical devices, connected devices, and/or smart devices at a network level. Various communication protocols between components may be used depending on types of devices connecting to each other and types, amounts, and frequency of data being exchanged. Non-limiting examples of connection protocols may include the IoT device 110, such as a base station or a fixture, having a wired (e.g., CAT5, USB) connection to the router or gateway 124 and using any TCP/IP protocol for wired connections; or the IoT device 112, 114, 116 having a wireless connection to the router or gateway 126 and using wireless TCP/IP protocols, such as WiFi or MQTT. In some embodiments, the IoT device 112 may communicate directly with the IoT device 114 using the above-described wireless protocols or other suitable protocols, such as Bluetooth. In some embodiments, connections between the IoT devices 110, 112, 114 and the connected objects 102 may be wired or may be indirect and based on a sensor interface, and in some embodiments, a connection between the IoT device 116 and the connected object 104 may be wireless, using a suitable protocol, such as RFID when the connected object 104 is RFID-enabled. More generally, a communication network as described herein can include a Wi-Fi network (e.g., an 802.11x network, which can include one or more wireless routers, one or more switches, etc.), a peer-to-peer network (e.g., a Bluetooth network, a ZigBee® network, a Z-Wave® network, a proprietary RF connection, etc.), a cellular network (e.g., a 3G network, a 4G network, 5G network, etc. complying with any suitable standard, such as CDMA, GSM, LTE, LTE Advanced, WiMAX, etc.), a wired network, an EnOcean® network, etc. In some embodiments, the communication network can be and/or include the LAN 120, the WAN 122, a public network (e.g., the internet,) a private or semi-private network (e.g., a corporate or university intranet), any other suitable type of network, or any suitable combination of networks. Communications links between the connected objects 102, 104, the router or gateway 124, 126, the physical, remote server computing devices 160, and/or the IoT devices 110, 112, 114, 116 can be and/or include any suitable communications links or combination of communications links, such as wired links, fiber optic links, Wi-Fi links, Bluetooth links, cellular links, etc.

A user may operate one or more client computing devices, such as the local user device 130, which can include a desktop or laptop computer, or the remote user device 132, which can include a mobile computing device, such as a phone or a tablet, running client software that can enable the local user device 130 or the remote user device 132 to access an interface to the IoT platform provided by the local server computing device 118, the virtual servers 150, and/or the physical, remote server computing devices 160. Each of the local user device 130 and the remote user device 132 may include at least one processor executing specific computer-executable instructions (i.e., running software) stored in a memory coupled thereto. The user may access and run a client-based software, such as a web browser or a web application, in order to request access to system level software and/or a GUI (e.g., by entering a Uniform Resource Locator (URL) for a web page including the GUI). This request may identify the IP address for the local server computing device 118, the virtual servers 150, and/or the physical, remote server computing devices 160 and instructions to generate and render the GUI and/or the web page for the system level software. The local server computing device 118, the virtual servers 150, and/or the physical, remote server computing devices 160 may execute one or more software instructions to generate and render the GUI and transmit the GUI to the local user device 130 and/or the remote user device 132 for display. The local server computing device 118, the virtual servers 150, and/or the physical, remote server computing devices 160 may include components and data processing capabilities used to host and run software applications that allow for bi-directional communication between the IoT devices 110, 112, 114, 116 and the local server computing device 118, the virtual servers 150, and/or the physical, remote server computing devices 160. For example, the local server computing device 118, the virtual servers 150, and/or the physical, remote server computing devices 160 may host customizable software that is deployed to and installed on the IoT devices 110, 112, 114, 116. The local server computing device 118, the virtual servers 150, and/or the physical, remote server computing devices 160 may also run software and protocols for other services used by the IoT platform and for interfacing with the local user device 130 and the remote user device 132. Example uses of user interaction with the IoT platform may include configuring and deploying server resources, configuring and deploying software and settings for the IoT devices 110, 112, 114, 116, obtaining and/or reviewing data collected by the local server computing device 118, the virtual servers 150, and/or the physical, remote server computing devices 160 from the IoT devices 110, 112, 114, 116 (e.g., viewing current status), performing and/or reviewing data analysis, accessing particular ones of the IoT devices 110, 112, 114, 116, etc. In some embodiments, the IoT device 116 can communicate directly with the local user device 130 and/or the remote user device 132 using a short range wireless protocol, such as Bluetooth. This direct connection may be useful upon startup of the IoT device 116 or if the router or gateway 126, the internet, the WAN 122, the LAN 120, the remote server computing devices 122, the virtual servers 150, or the local server computing device 118 are not available.

Figure 2A:
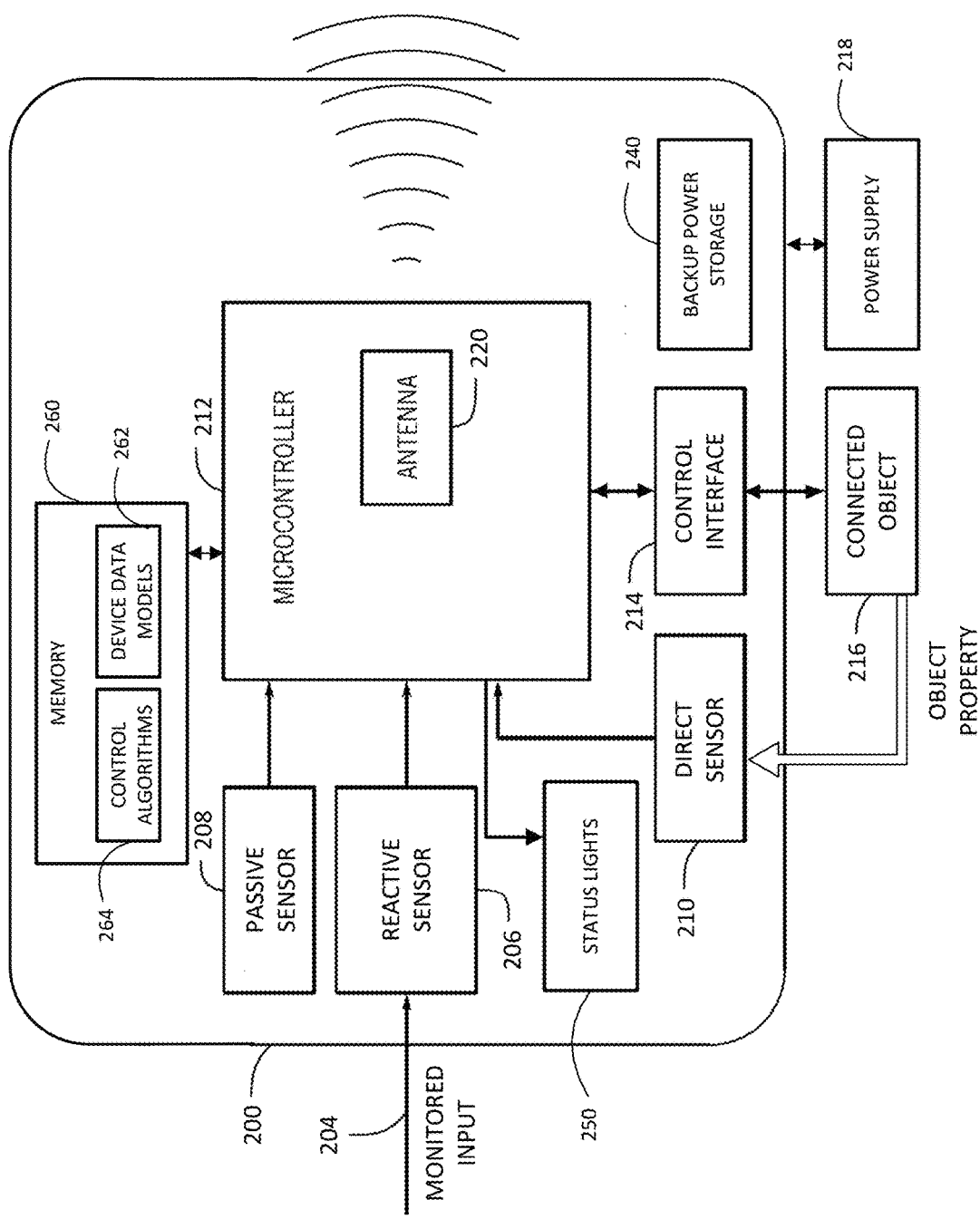
FIG. 2A is a block diagram of an example IoT device in accordance with various embodiments.

FIG. 2A shows internal (i.e., partially or fully inside a housing) components of an example IoT device 200 in accordance with some embodiments of the invention (e.g., as an example of one or more of the IoT devices 110, 112, 114, 116 of FIG. 1). The IoT device 200 can be mounted on a vertical surface, such as a wooden post, for example, a 4×4 post, or a wall, for example, a brick wall, a concrete wall, etc. As shown in FIG. 2A, the IoT device 200 may serve to both collect data associated with a connected object 216 and control one or more operations and/or operating or configuration parameters of the connected object 216. In some embodiments, another IoT device for the connected object 216 may only collect and report the data associated with the connected object 216 or only control the operations and/or the operating or configuration parameters of the connected object 216.

To collect the data associated with the connected object 216, the IoT device 200 may include, connect to, and/or communicate with one or more of several different types of sensors. Non-limiting examples of the different types of the sensors that may cooperate with or be incorporated in the IoT device 200 may include reactive sensors 206, passive sensors 208, and direct sensors 210, among others. A reactive sensor 206 can detect and report certain monitored inputs 204 on the connected object 216 or the IoT device 200 itself, and examples of the reactive sensor 206 can include a pressure transducer that detects a button press or a fluid pressure level, a moisture sensor, a flow rate sensor, a photodiode or other light receptor, and a sample analyzer that collects a sample (e.g., of water in which the reactive sensor 206 is submerged) and measures a property of the sample (e.g., total dissolved solids). Of note, a sample analyzer may also be a direct sensor 210 if the connected object 216 is a body of water as opposed to a water filter in the body of water. A passive sensor 208 can be used to provide a multi-function service button for providing a human-machine interface (HMI), and the HMI may also include one or more status lights 250, such as LED's, coupled to a microcontroller 212 that can communicate a status of the IoT device 200, such as connectivity, power, access point (AP) mode, service mode, vacation mode, and/or timeout mode, by, for example, using a red LED and a green LED. The passive sensor 208 can detect environmental and other ambient properties, and examples of the passive sensor 208 may include an ambient temperature sensor, an ambient light sensor (e.g., for sunlight), a humidistat, etc. The direct sensor 210 can be connected to the connected object 216, in communication therewith, or otherwise oriented to monitor one or more specific properties of the connected object 216, and examples of the direct sensor 210 may include a thermistor for monitoring a temperature of the connected object 216, a biometric sensor, a sample analyzer (e.g., of water at an inlet or an outlet of a water filter), a current sensor, a speed sensor, etc. In some embodiments, the reactive sensor 206, the passive sensor 208, or the direct sensor 210 can be the connected object 216 if the reactive sensor 206, the passive sensor 208, or the direct sensor 210 is coupled to an appropriate control interface 214. In this case, the direct sensor 210 may communicate using a two wire connection with the control interface 214, which can be a two wire port.

Any of the reactive sensor 206, the passive sensor 208, and/or the direct sensor 210 may be configured to monitor a corresponding property continuously, at intervals, or randomly, and/or may "listen" for inputs and react when those inputs are detected. The reactive sensors 206, the passive sensor 208, and/or the direct sensor 210 may also continuously generate data may only generate data at intervals, or may only generate data when the corresponding property monitored meets one or more particular thresholds. In any embodiment, the data generated may describe a state of the corresponding property being measured. The reactive sensor 206, the passive sensor 208, and/or the direct sensor 210 may send the data generated to the microcontroller 212 of the IoT device 200, and the microcontroller 212 may be any suitable microprocessor, including single- and multi-core CPUs, wireless-enabled microcontrollers, and other known microcontrollers having enough processing power to receive the data generated from the reactive sensor 206, the passive sensor 208, and/or the direct sensor 210 and transmit the data received to a receiving device, such as any gateway/router as described herein or any local or cloud server as described herein. In some embodiments, the microcontroller 212 can be configured to itself act as a wireless gateway module. For example, the microcontroller 212 can be implemented using a single-chip wireless microcontroller, such as the CC3200MOD microcontroller available from Texas Instruments® (of Dallas, Texas), which can include a CC3200R1M2RGC microcontroller from Texas Instruments®. The microcontroller 212 may further have sufficient computing power to receive control commands from any router/gateway as described herein, any local or cloud server as described herein, another IoT device, or any client computing device as described herein and transmit the control commands to the connected object 216 as described below. The microcontroller 212 may further have sufficient resources to store and execute data analysis algorithms, such as processing methods that enable the microcontroller 212 to evaluate the data received from the reactive sensor 206, the passive sensor 208, and/or the direct sensor 210 and transmit the control commands to the connected object 216 based on the data as evaluated. For example, the microcontroller 212 and/or the IoT device 200 can include any suitable memory 260, such as volatile memory, non-volatile memory, storage, or any suitable combination thereof. For example, the memory 260 can include RAM, ROM, EEPROM, one or more flash drives, one or more hard disks, one or more solid state drives, one or more optical drives, etc. In some embodiments, the memory 260 can have encoded thereon a computer program, such as one or more control algorithms 264 for controlling operation of a hardware processor (e.g., the microcontroller 212) in the form of computer executable instructions that, when executed by the hardware processor, cause the hardware processor to perform one or more actions as indicated by the instructions. The memory 260 can also store device data models 262 containing configuration parameters for components connected to the IoT device 200. For example, the configuration parameters can include a pump speed, a target pool temperature, or a predetermined chemical dispersion amount as will be discussed later. The configuration parameters can be the most recent configuration parameters received from the physical, remote server computing devices 160.

In some embodiments, the microcontroller 212 or the IoT device 200 can include one or more antennas 220 configured to send and/or receive wireless signals, such as signals for communicating over Wi-Fi, Bluetooth, ZigBee, Z-Wave, free-space optical, etc. In such embodiments, the antenna(s) 220 can receive the wireless signals from a wireless gateway/router as described herein and can transmit the wireless signals to the microcontroller 212 for processing into various commands. Additionally or alternatively, the antenna(s) 220 can send the wireless signals generated by the microcontroller 212 to the wireless gateway/router as described herein. In some embodiments, the antenna(s) 220 can be an integral part of the microcontroller 212. Additionally or alternatively, in some embodiments, the antenna(s) 220 can be mounted to a printed circuit board (PCB) and electrically connected to the microcontroller 212 and/or can be mounted to a housing of the IoT device 200. In some embodiments, the IoT device 200 can communicate with any local or cloud server as described herein and/or other networked IoT devices using the antenna(s) 220. For example, the IoT device 200 can use the antenna(s) 220 to communicate using a direct connection (e.g., over a Bluetooth connection or a direct Wi-Fi connection, such as an ad hoc Wi-Fi connection or a direct Wi-Fi connection), and/or an indirect connection (e.g., over a LAN, a mesh network, etc.). In some embodiments, the antenna(s) 220 can include an ESP32 Wi-Fi/Bluetooth chipset coupled to an externally mounted antenna (not shown).

In some embodiments, the IoT device 200 can include one or multiple ones of the control interface 214 to enable the IoT device 200 to control the operations and/or the operating or configuration parameters of the connected object 216. The control interface 214 may include any suitable electrical and/or electronic components and connections needed to enable a desired control of the connected object 216. For example, when the connected object 216 is a water pump, the control interface 214 can connect to the water pump with a digital input/output port, such as a 6 pin digital port and, based on signals from the microcontroller 212, provide an appropriate signal for a desired operating parameter of the water pump, such as a pump speed of a variable speed pump. Additionally, in some embodiments, the digital input/output port can receive signals, such as packets of digital data representing status information and other digital data transmissions, from the water pump and deliver those signals to the microcontroller 212 or another component. In another example, the water pump can have an integrated controller for transmitting and receiving signals to and from the IoT device 200 (e.g., via the control interface 214). The microcontroller 212 may provide an appropriate format of those signal to cause the control interface 214 to apply the desired control. For example, when the connected object 216 is a digital device, the control interface 214 may be an API that converts control signals from the microcontroller 212 to function calls that the control interface 214 sends to the connected object 216 to change the operations and/or the operating or configuration parameters of the connected object 216. In another example, the control interface 214 can be a high voltage relay, which can allow the IoT device 200 to control the connected object 216 as a single speed pump.

In yet another example, the control interface 214 can be a serial communications interface, such as a RS-485 port. In this example, the control interface 214 can be used to control and receive information from the connected object 216 as a variable speed pump, a chemical controller, such as a salt chlorine generator, a chemical sensor, a pool heat pump, a pool heater, a temperature sensor, combinations thereof, and other devices equipped with a RS-485 interface. In a further example, the control interface 214 can be an isolation switch, such as a fireman's switch.

In some embodiments, the IoT device 200 can include a power supply 218 that can be external to the IoT device 200 and provide power for operation of the microcontroller 212 and/or any other suitable low voltage devices within the IoT device 200. For example, the IoT device 200 can receive input power at a low voltage from the power supply 218. In particular, the power supply 218 can receive the input power at an AC voltage, such as 120 V and 60 Hertz (Hz), which is not suitable for operation of the microcontroller 212, which is typically a low voltage device (e.g., operating at 3.3 V DC, 5 V DC, 12 V DC, 24 V DC, etc.) and convert the AC voltage to low voltage DC power in order to power one or more other components of the IoT device 200, such as the microcontroller 212. The power supply 218 may provide power in a variety of other ways, for example, from harvested energy, such as solar energy, or wirelessly through inductive coupling or resonant inductive coupling. In some embodiments, the power supply 218 can power a backup power storage 240, such as a battery, an ultracapacitor, a fuel cell, etc., that can be internal to the IoT device 200 and provide supplemental power to continue to operate the IoT device 200 when the power supply 218 is interrupted or a primary battery fails. In some embodiments, the backup power storage 240 can be a CR2032 battery. When the power supply 218 is external to the IoT device, such an arrangement can reduce a size of the IoT device 200 as compared to more conventional designs with built in power supplies. Advantageously, the low voltage operation of the reactive sensor 206, the passive sensor 208, the direct sensor 210, the control interface 214, and the microcontroller 212 can allow the IoT device 200 to be installed without an electrician. Additionally, the low voltage operation of the IoT device 200 means that other devices, such as sensors, relay-operable devices, pumps, heaters, or other pool devices can be connected to the IoT device 200 without the need for an electrician.

Figure 2B:
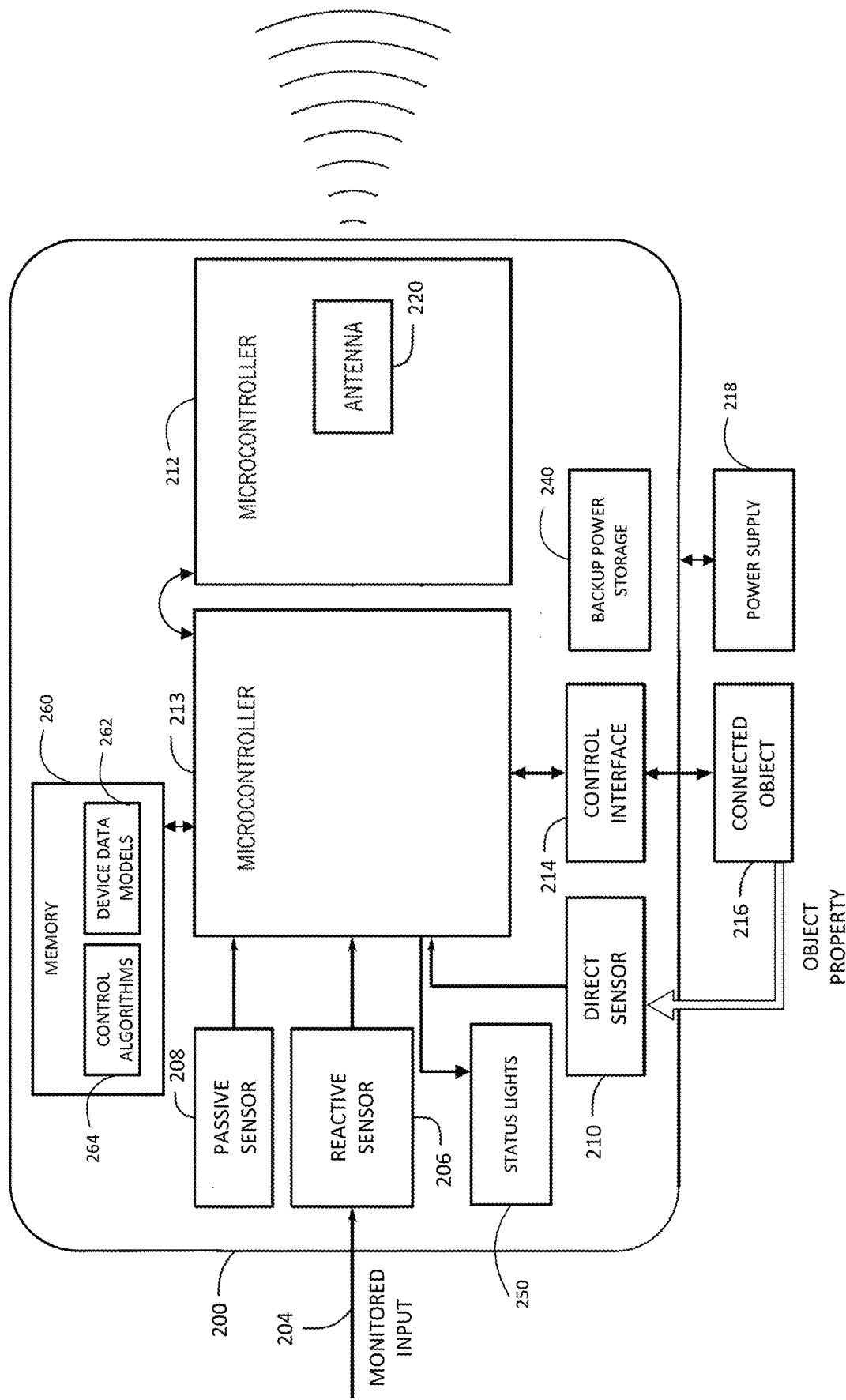
FIG. 2B is a block diagram of an example IoT device in accordance with various embodiments.

FIG. 2B shows the internal (i.e., partially or fully inside a housing) components of an example IoT device 200 in accordance with some embodiments of the invention (e.g., as an example of one or more of the IoT devices 110, 112, 114, 116 of FIG. 1). The components of FIG. 2B may be substantially the same as FIG. 2A except that some or most functions of the microcontroller 212 may be performed by a secondary microcontroller 213 with the exception of sending and/or receiving the wireless signals via the antenna(s) 220. The secondary microcontroller 213 may be coupled to microcontroller 212 and command the microcontroller 212 to wirelessly send appropriate data when applicable. The microcontroller 212 may also receive any data wirelessly via the antenna(s) 220 and send that data to the secondary microcontroller 213. The secondary microcontroller may otherwise function as described above in connection with the microcontroller 212.

Figure 3:
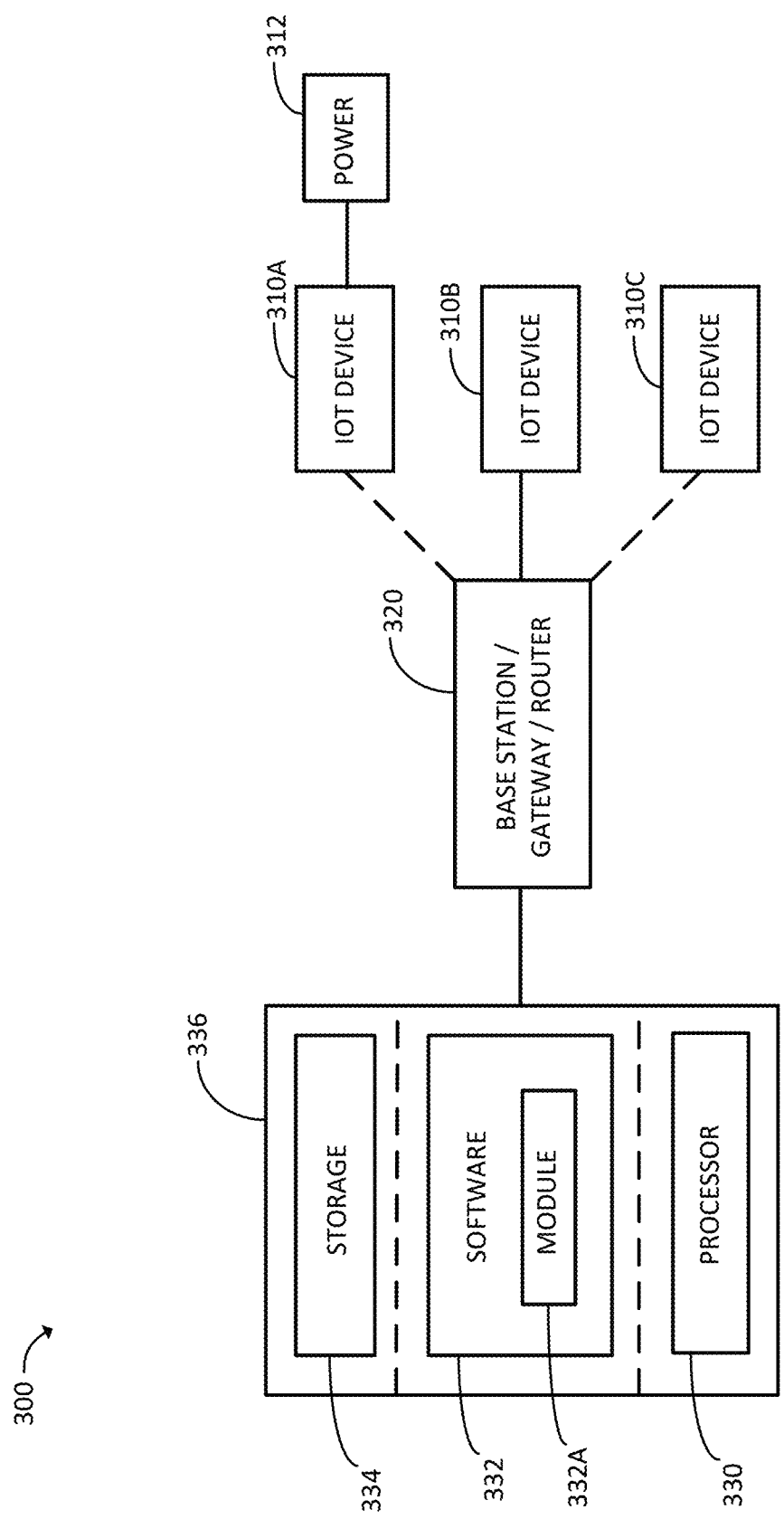
FIG. 3 is a block diagram of an example system that includes a server and IoT devices in accordance with various embodiments.

FIG. 3 illustrates additional details of a communication system 300 in accordance with various embodiments of the invention. For example, the communication system 300 can include IoT devices 310A, 310B, 310C (e.g. the IoT device 200 of FIG. 2), a power source 312, a base station, router, or gateway 320, a server 336, a processor 330, software 332, and storage 334.

As described above in FIG. 1, FIG. 2A, and FIG. 2B, the IoT devices 310A, 310B, 310C may sense data about an environment and/or users and/or a connected object. The IoT device 310A, 310B, 310C can provide raw sensor data and/or processed sensor data to the server 336 via the base station, router, or gateway 320. Additionally or alternatively, the IoT devices 310A, 310B, 310C may receive any data, such as control signals generated by the server 336 or a client computing device or sensor data from other IoT devices, from the server 336 via the base station, router, or gateway 320. The IoT devices 310A, 310B, 310C may communicate with the base station, router, or gateway 320 through a wired (e.g., IoT device 310B) or wireless (e.g., IoT devices 310A, 310C) connection. The IoT device 310B may also receive power through the wired connection with the base station, router, or gateway 320 while the IoT device 310A may receive power from the power source 312. The IoT device 310C need not have a separate power source and may, instead, rely on piezoelectric technology or other technology to provide sufficient energy for transmitting information to the base station, router, or gateway 320. Depending on the embodiment, the IoT devices 310A, 310B, 310C may employ a range of technologies.

The base station, router, or gateway 320 may relay any information to the server 336 and may be coupled to the server 336 via a LAN or a WAN. In particular, the base station, router, or gateway 320 may be any device suitable to receive, aggregate, and/or relay any information received from the IoT devices 310A, 310B, 310C, including, for example, a wireless router or a Room Wizard™. The base station, router, or gateway 320 may include existing technology affiliated with other services of an organization or may be provided to the organization specifically for use with the IoT devices 310A, 310B, 310C. For example, the base station, router, or gateway 320 may be a base station comprising computing resources, such as a processor, memory, and specific program instructions (e.g., software or firmware) that the processor executes to communicate with and/or monitor deployed ones of the IoT devices 310A, 310B, 310C. In some embodiments, more than one of the base station, router, or gateway 320 may be used to optimize performance. For example, a number and/or positioning of the base station, router, or gateway 320 may depend on a number and/or positioning of the IoT devices 310A, 310B, 310C.

As any information from one or more of the IoT devices 310 reaches the server 336, the software 332 may determine how that information is processed. In particular, a software module 332A can configure the processor 330 to perform a variety of tasks, such as processing any data collected from the IoT devices 310A, 310B, 310C and/or sending any control signals to the IoT devices 310A, 310B, 310C for controlling corresponding connected object(s). For example, the processor 330 may analyze incoming data related to a user's location, orientation, or interaction with any client computing device. Additionally or alternatively, the processor 330 may make determinations or conclusions about the user, a group of users, an object, a group of objects, or other environmental or input conditions based on the incoming data. The processor 330 may also relay any information or send any conclusions to the user or the group of users. Any incoming data from the IoT devices 310A, 310B, 310C, other incoming data or inputs, conclusions, and other data may be stored in the storage 334.

In various embodiments, the server 336 may be a virtual server or may represent a cluster of servers. Some or all portions of the block diagram of FIG. 3 may be located physically on site at an organization's location, and some or all portions of the block diagram of FIG. 3 may be located remotely in the cloud. For example, in one embodiment, the server 336 may physically include the processor 330 while the software 332, the software module 332A, and the storage 334 may be located in a remote or cloud server. In another embodiment, only the software 332 or the storage 334 may be located in the remote or cloud server. The software module 332A may also communicate with a variety of other servers, processors, hardware, and software located in the server 336 or in other servers or other locations. For example, the software module 332A may communicate with another server to ensure that the user's calendar or reservation information is up to date.

Figure 4:
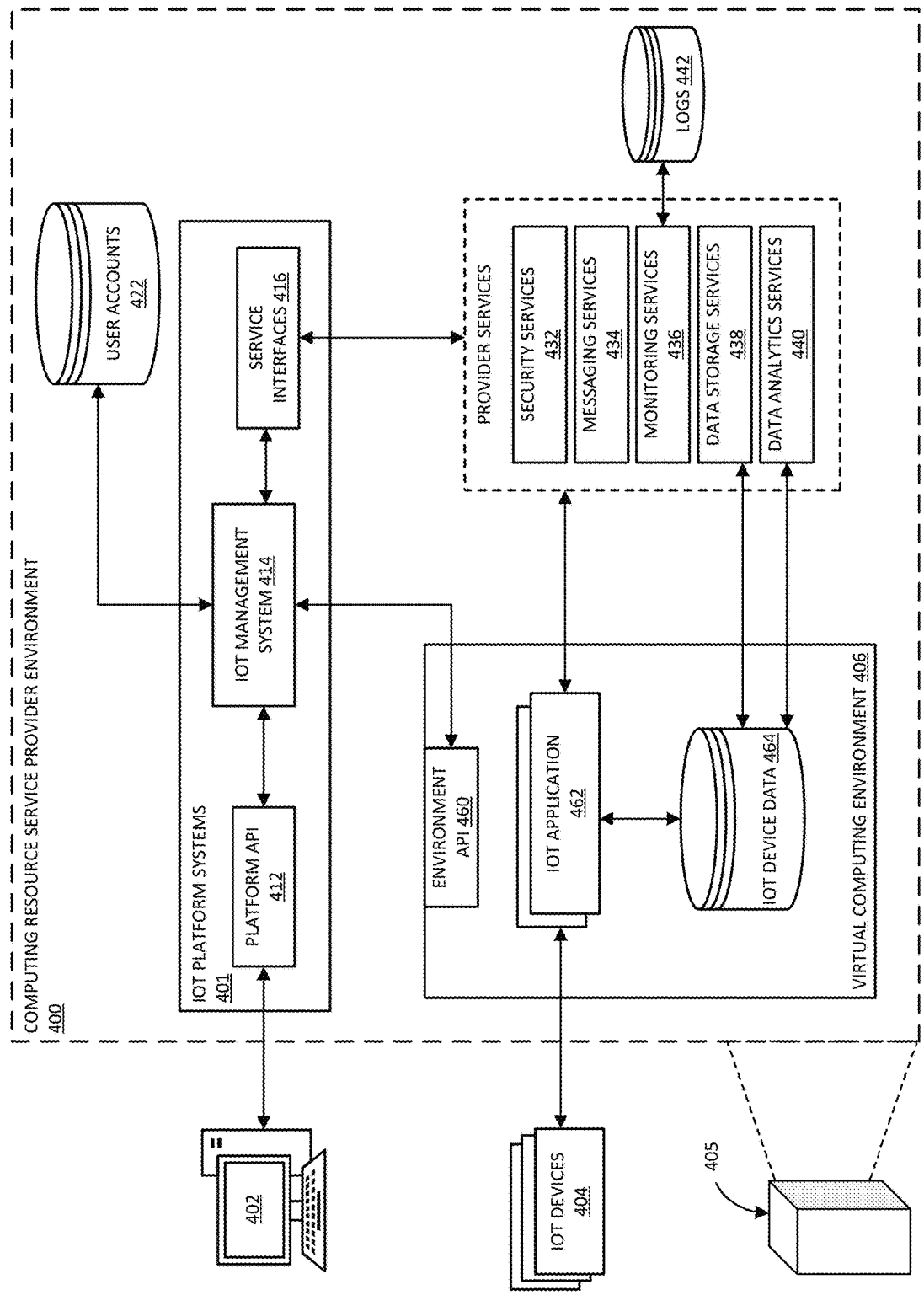
FIG. 4 is a block diagram of an example computing environment in accordance with various embodiments.

FIG. 4 illustrates an example computing environment 400 accessible via one or more computer networks by a user of a user computing device 402 and by one or more IoT devices 404 (e.g. one or more of the IoT devices 310A, 310B, 310C of FIG. 3) configured and deployed as described above. The computing environment 400 may, for example, be provided by the virtual servers 150 and/or the physical, remote server computing devices 160 of FIG. 1 (i.e., a computing device 405 may be one of the physical, remote server computing devices 160 of FIG. 1). FIG. 1 illustrates a conceptual operation of systems and methods in interaction via the local user devices 130 and/or the remote user device 132, with a "client" or administrator of the IoT devices 110, 112, 114, 116 deployed in the computing environment 100. However, FIG. 4 illustrates a computing architecture in which the client may access computing systems of the computing environment 400 (e.g., using the client's user account credentials) by using the user computing device 402 to connect to one or more user interfaces provided (e.g., as websites, web applications, command consoles, APIs, etc.) in the computing environment 400. The user interfaces may enable the client to manage virtual computing resources allocated to the client's user account and configured to implement the IoT platform for the client's IoT devices 404.

The computing environment 400 may include one or more systems 401 that can cooperate to enable deployment of the IoT platform using a customized configuration for a particular user. The systems 401 may include a platform API 412 to which the client via the user computing device 402 can connect in order to configure, deploy, manage, and otherwise interact with the client's IoT platform. In some embodiments, the platform API 412 can provide secure access to an IoT management system 414 that can include or access services and data needed to interact with the IoT platform, IoT applications 462, and/or the IoT devices 404 that are deployed within or connect to the client's virtual computing environment 406 as described below. In some embodiments, the IoT management system 414 may access one or more user account data stores 422 that can contain user account information and other private information associated with the client's user account. For example, the IoT management system 414 may store and retrieve configuration settings for particular ones of the IoT devices 404 and/or IoT applications 462 that the client has previously submitted.

The computing environment 400 can include and implement at least one of the virtual computing environment 406 in which a user may obtain virtual computing resources that can enable the user to run programs, store, retrieve, and process data, access services of the computing environment 400, etc. The virtual computing environment 406 may be one of any suitable type and/or configuration of a computer resource virtualization platform implemented on one or more physical computing devices. Non-limiting examples of the virtual computing environment 406 can include a data center, a cluster of data centers organized into zones or regions, a public or private cloud environment, etc. The virtual computing environment 406 may be associated with, controlled, and managed by the client. In some embodiments, the virtual computing environment 406 of a particular client may be dedicated to that client, and access thereto by any other user or service of the computing environment 400 may be prohibited except in accordance with access permissions granted by that client. In some embodiments, an environment API 460 may serve as a front-end interface that can provide access to the virtual computing resources of the virtual computing environment 406 based on whether or not requests to access the virtual computing environment 406 are authorized. For example, the IoT management system 414 may deploy IoT platform-related resources, push configuration changes, and request information about such resources via calls to the environment API 460. Additionally or alternatively, other channels, such as TLS-encrypted data channels, may be enabled to allow data to enter or exit the virtual computing environment 406 without passing through the environment API 460. For example, one of the IoT applications 462 in the virtual computing environment 406 may be configured to communicate directly with the IoT devices 404 and/or certain services in the computing environment 400.

In some embodiments, the client's IoT platform may be deployed by installing one or more of the IoT applications 462 into the client's virtual computing environment 406. The IoT applications 462 may be software programs or suites of software programs that include program instructions that enable a processor executing the IoT applications 462 to communicate with deployed ones of the IoT devices 404, sending and/or receiving data, processing data, and making decisions in accordance with desired goals and functions of the IoT platform. For example, the IoT applications 462 may cause the processor to receive sensor data from the IoT devices 404, process the sensor data to determine whether to take any actions, and perform any identified action, such as reporting a status of connected objects to the client, sending new commands to one or more of the IoT devices 404, storing data (e.g., in an IoT device data store 464), etc. The IoT applications 462 may be executed within the virtual computing resources allocated to the client's virtual computing environment 406, such as one or more virtual machine instances or logical container instances configured to provide virtualized physical computing resources for purposes of performing functions of the IoT applications 462. For example, one of the virtual machine instances may be launched from a software image including any configuration information (e.g., operating system, memory, disk storage, network interface configuration, and software program code) needed to provide an execution environment for the IoT applications 462.

The computing environment 400 may include data processing architecture that can implement systems and services that operate "outside" of any particular user's virtual computing environment 406 and perform various functions, such as managing communications to the virtual computing environment 406, providing electronic data storage, and performing security assessments and other data analysis functions. These systems and services may communicate with each other, with devices and services outside of the computing environment 400, and/or with the virtual computing environment 406. Services depicted in FIG. 4 as inside or outside of the virtual computing environment 406 may be suitably modified to operate in the data processing architecture in a different fashion than what is depicted. The IoT management system 414 may include or communicate with one or more service interfaces 416, such as APIs, that can enable the IoT management system 414 and/or other components of the IoT platform as deployed (e.g., the IoT applications 462) to interact with one or more of these systems and services. Non-limiting examples of provider services that may be invoked or accessed to work in conjunction with the IoT platform can include security services 432 that can maintain and apply security policies, access controls, and the like, encrypt and decrypt information, create secure transmission (e.g., TLS) channels, etc.; messaging services 434 that can transmit triggering events and other notifications between subscribing users and services and or/provide queueing services for prioritizing synchronous and asynchronous operations (e.g., API calls); monitoring services 436 that can monitor network activity and computing resource usage and generate logs 442 of activity; data storage services 438 that can maintain distributed storage devices, databases, etc. and maintain and/or obtain any data stored in the IoT device data store 464; and data analytics services 440 that can collect any data (e.g., aggregated sensor data) and perform analytics on that data, such as machine learning, trend analysis, general monitoring/alerting, etc.

Figure 5:
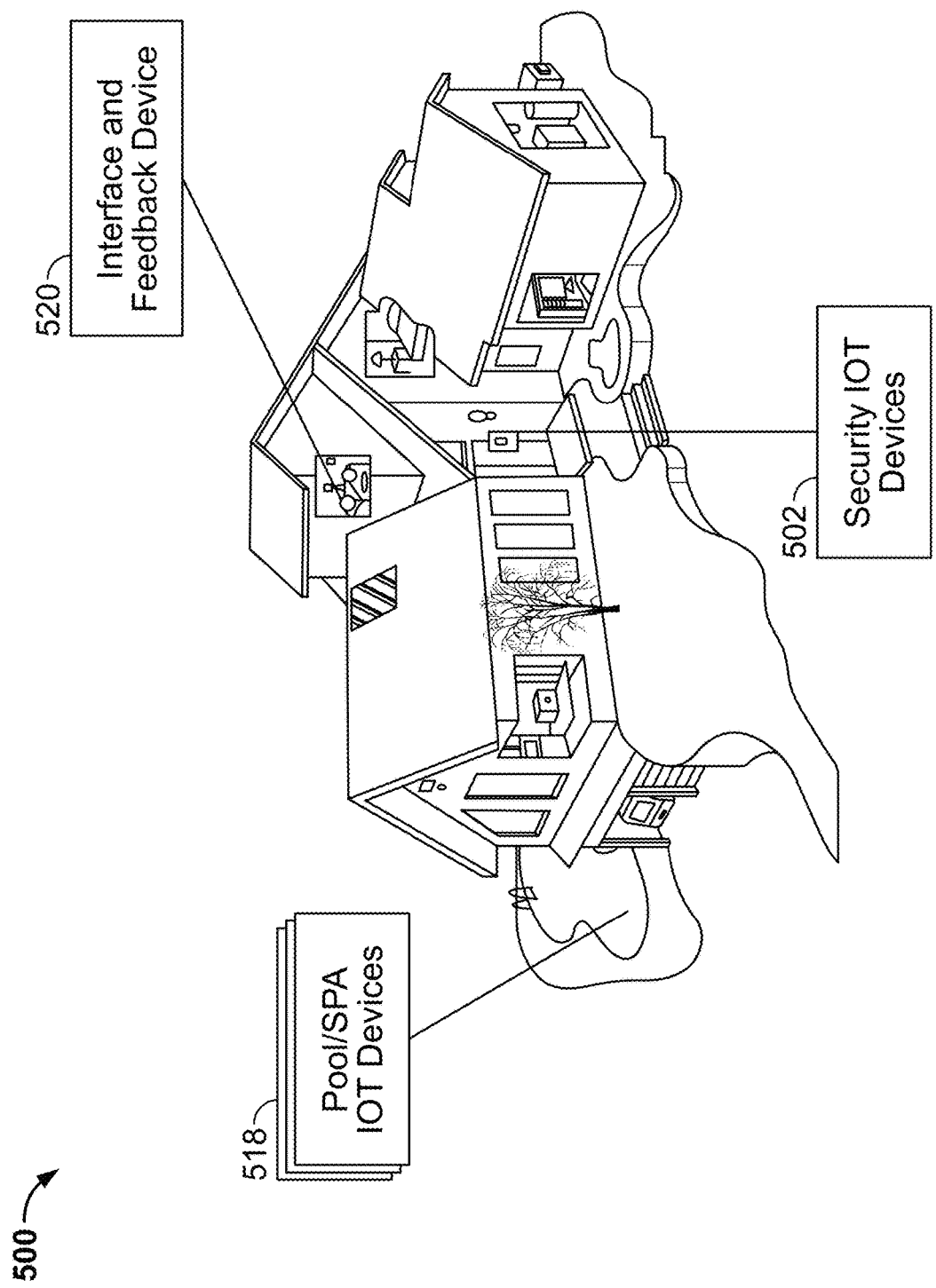
FIG. 5 is a block diagram of an example connected residence that includes various embodiments.

FIG. 5 illustrates an example connected residence 500 with example IoT device deployment at the connected residence 500 in order to create a set of connected objects around the connected residence 500. The illustrated examples of IoT devices for connecting to certain objects are not limiting, but are demonstrative of a "smart home" concept in which status can be monitored and/or operations can be controlled for residential devices and systems that historically could only be monitored and controlled manually. Additionally, by using the IoT platform described above with user interactions and feedback, data from different types of objects and IoT devices may be collected, aggregated, and analyzed to identify previously unknown optimizations, synergies, impacts, and cooperative functionalities between objects in the connected residence 500. In the illustrated example, the IoT devices may be natively included as components of corresponding ones of the connected object or may be retroactively connected (e.g., via sensors and control interfaces as described above) to unconnected objects to connect those object to the IoT platform.

Non-limiting examples of the IoT devices in the connected residence 500 can include security IoT devices 502 that can monitor home activity, such as indoor and outdoor video cameras, security/alarm systems, etc., and pool and spa IoT devices 518 for connecting to pool controls, pool pumps, pool lights, a pool/spa itself, etc. Some or all of the pool and spa IoT devices 518 may collect and send data to a gateway, router, or base station in the connected residence 500 or directly to a cloud-based server. In this regard, configuration and control commands may be transmitted in an opposite direction.

The IoT device deployment may further include one or more IoT platform interface/feedback devices 520, such as a resident's desktop PC, smartphone, tablet, laptop, or smart device, such as Google Home, Amazon Alexa, Apple HomePod etc., having software or a browser interface executing thereon to access the IoT platform and monitor, configure, control, add, remove, change, and/or perform other management operations on the security IoT devices 502 and/or the pool and spa IoT devices 518 and/or interact with collected and analyzed data.

Figure 6:
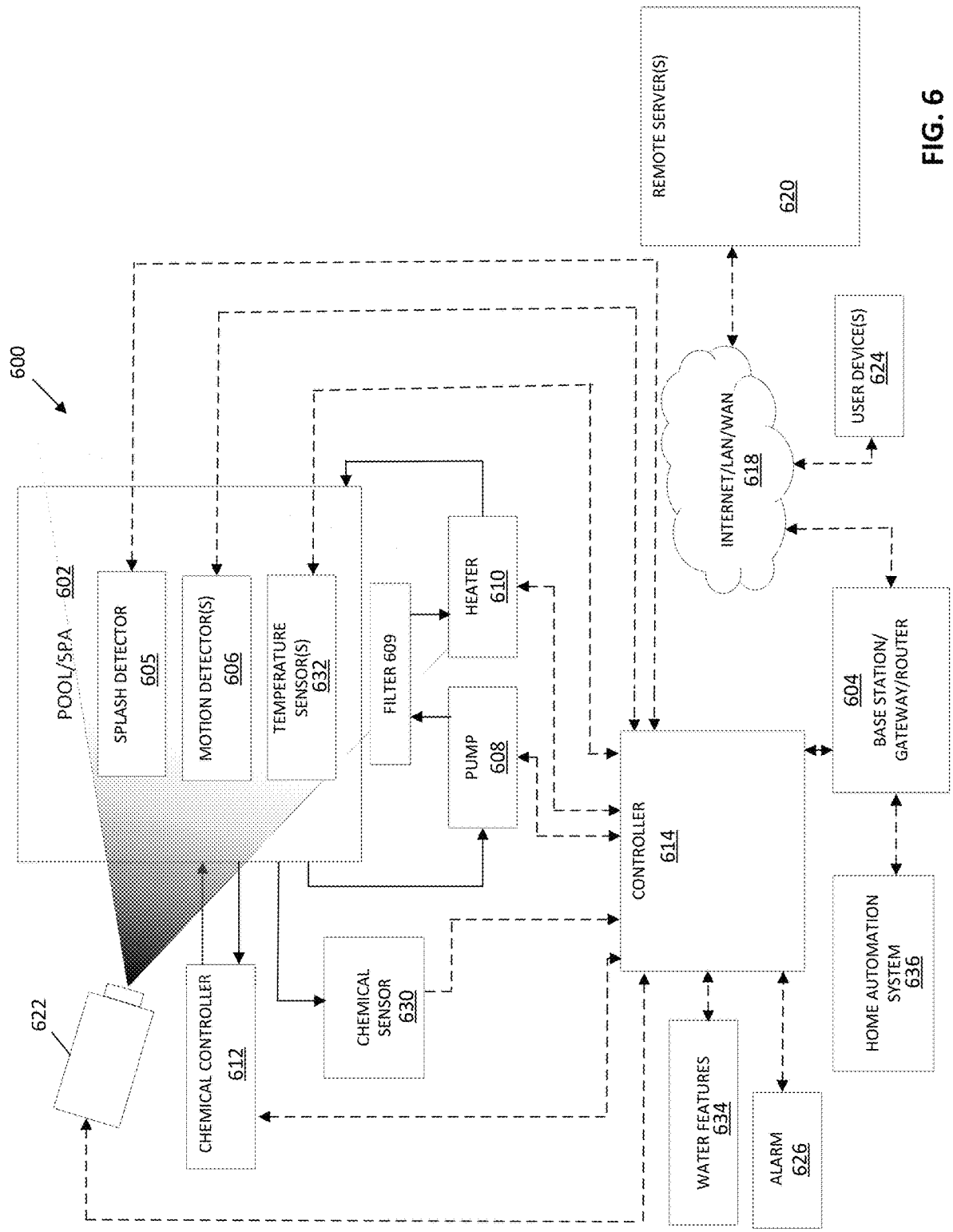
FIG. 6 is a block diagram of an example system by which a pool or a spa may be monitored and maintained in accordance with various embodiments.

FIG. 6 illustrates an example system 600 by which a pool or spa 602 may be monitored and maintained in accordance with various embodiments of the invention. The system 600 may include one or more network-enabled devices (e.g., network-enabled via an IoT device, such as one of the IoT devices 404 of FIG. 4) coupled to the pool or spa 602, including a chemical controller 612 that can be in fluid communication with the pool or spa 602, a pump 608 that can be in fluid communication with the pool or spa 602, a heater 610 that, when activated, can increase a temperature of water in the pool or spa 602, a camera 622 that can have some or all of the pool or spa 602 in its field of view, and a splash detector 605 or motion detectors 606 that can be disposed in the pool or spa 602. The system 600 may further include a controller 614 (e.g., a controller of the one of the IoT devices 404), a gateway 604 (e.g., the base station, router, or gateway 320 of FIG. 3), a network 618, one or more remote servers 620 (e.g., the computing device 405 of FIG. 4), one or more user devices 624 (e.g., the user computing device 402 of FIG. 4), one or more alarms 626, one or more chemical sensors 630, and/or one or more temperature sensors 632. Each of the splash detector 605, the motion detectors 606, the pump 608, the heater 610, the chemical controller 612, the controller 614, the camera 622, and/or the alarms 626 may be coupled to and in electronic communication with the gateway 604. The remote servers 620 and the user devices 624 may also be coupled to and in electronic communication with the gateway 604 over the network 618. A user may send commands from the user devices 624 to the controller 614 over the network 618, the remote servers 620, and/or the gateway 604.

The pump 608 may receive water from a drain of the pool or spa 602 (e.g., via a suction inlet) and may discharge the water back into the pool or spa 602 through the heater 610, which can increase the temperature of the water discharged by the pump 608. The pump 608 may be a circulating pump normally used with pools or spas that is also network-enabled and, therefore, capable of receiving commands remotely (e.g., from the controller 614 or the remote servers 620). The heater 610 may be a gas, electric, or solar heating unit normally used with pools or spas that is also network-enabled and, therefore, capable of receiving commands remotely (e.g., from the controller 614, the remote servers 620, or the user devices 624). The pump 608 and/or the heater 610 may be coupled to the controller 614 using an appropriate control interface (e.g. the control interface 214 of FIG. 2). The user may control the pump 608 using the controller 614 or the user devices 624. For example, the user may turn the pump 610 on and off when the pump 610 is a single speed pump. The user may control a speed of the pump 608 when the pump 610 is a variable speed pump. In some embodiments, a filtration unit 609 may be coupled between an outlet of the pump 608 and an input of the heater 610. The controller 614 may not allow operation of the heater 610 unless the pump 608 is operating.

The chemical controller 612 may control a chemical balance of a body of liquid, such as the pool or spa 602, that is also network enabled and, therefore, capable of receiving commands remotely (e.g., from the controller 614 or the remote servers 620). For example, the chemical controller 612 may include one or more chemical balance sensors (e.g., for sensing pH levels and chlorine levels) that can periodically (e.g., at a predefined rate) compare chemical levels of water received from the pool or spa 602 with a standard water sample stored within the chemical controller 612 and having a desired chemical balance. The chemical sensor 630 may be a standalone chemical balance sensor as described above, which can be used when the chemical controller 612 does not have a chemical balance sensor. If the chemical levels of the water received from the pool or spa as detected fail to sufficiently correlate with those of the standard water sample, then the chemical controller 612 may automatically dispense chemicals (e.g., chlorinated or acidic fluid) into the pool or spa 602. The chemical controller 612 may also dispense the chemicals on command from the user devices 624.

In some embodiments, the chemical controller 612 may dispense the chemicals proactively (e.g., in anticipation of or immediately following heavy rain). In some embodiments, the chemical controller 612 may have different selectable operating modes, such as a "normal" mode and a "vacation" mode such that the chemical controller 612 can sample and analyze water from the pool or spa 620 less frequently in the vacation mode as compared to the normal mode. As will be described below, the vacation mode may be initiated manually via commands input at a user interface of one of the user devices 624, the controller 614, or the chemical controller 612 itself or may be initiated automatically when it is detected (e.g., via the splash detector 605 and/or the motion detectors 606) that the pool or spa 602 has been unused for more than a predetermined time period. In this way, usage of the chemicals by the chemical controller 612 may be made more efficient, with chemical balancing of the pool or spa 602 being performed less often while its owners are assumed or confirmed to be absent. The controller 614 may activate one of the alarms 626 for a predetermined time period and/or send a notification to the user devices 624 following the chemicals being dispensed in order to warn the user to stay out of the pool or spa 602 until the pool or spa 602 is safe for the user to enter.

The splash detector 605 may be of a type normally used in pools or spas that is also network enabled and, therefore, capable of receiving commands and sending data remotely (e.g., to and from the controller 614 or the remote servers 620). For example, the splash detector 605 may include a vibration transducer securely mounted in the pool or spa 602. The splash detector 605 may be turned on when a person (e.g., the user, an owner, or a trusted adult) is not present to monitor usage of the pool or spa 602. As such, if an animal, a person, or a sufficiently large object enters the pool or spa 602 unexpectedly, then the user and, optionally, anyone in or around a residence adjacent to the pool or spa 602 may be alerted via electronic messages and/or alarms. For example, the splash detector 605 may be turned on manually via a user interface of the user devices 624 or the controller 614. Additionally or alternatively, the splash detector 605 may be turned on automatically after a predetermined time period has passed with no movement and/or splashing detected.

When the splash detector 605 is on, vibrations from a splash (e.g., caused by the animal, the person, or the sufficiently large object entering the pool or spa 602) are hydraulically transmitted to the vibration transducer, which can generate an electrical signal. The electrical signal generated may be sent to a processor of an on-board controller of the splash detector 605 or transmitted to a processor of the controller 614 or one of the remote servers 620. In any embodiment, the processor receiving the electrical signal generated may determine a magnitude of the that electrical signal and compare that magnitude to a predetermined threshold. If the magnitude of the electrical signal generated exceeds the predetermined threshold, then the processor can determine that something relevant has likely entered the pool or spa 602. Then, the processor may send an alert to one or more of the user devices 624 and may optionally instruct the alarms 626 to activate. The alarms 626 may be located spa/pool-side and/or inside the residence adjacent to the pool or spa 602. The alarms can produce sound (e.g., via conventional speakers) when activated in order to alert nearby persons to an unexpected entry of the person, the animal, or the sufficiently large object into the pool or spa 602.

One or more of the motion detectors 606 may be disposed at one or more locations around the pool or spa 602. The motion detectors 606 may detect motion within their "line-of-sight" if they are light-based (e.g., infrared), microwave-based, area reflective type, or ultrasonic motion detectors. Alternatively, the motion detectors 606 may detect nearby motion in multiple directions if they are vibration-based. For example, the motion detectors 606 may be positioned around the pool or spa 602 (e.g., mounted on the ground, walls, posts, etc. around the pool or spa 602). When the motion detectors 606 detect movement around the pool or spa 602, they may send an alert to the processor of the controller 614 or one of the remote servers 620 via electronic communication over the gateway 604 and/or the network 618. In response to the alert, the processor may instruct the splash detector 605 and/or the camera 622 to turn on via electronic communication over the gateway 604 and/or the network 618. In this way, the splash detector 605 and the camera 622 may be activated in response to the motion around the pool or spa 602 being detected, which may be indicative of the person, the animal, or the sufficiently large object that may enter the pool or spa 602, intentionally or otherwise.

The camera 622 may be a network-enabled video camera capable of receiving commands and sending data remotely (e.g., to and from the controller 614 or the remote servers 620). When activated, the camera 622 may capture a live video stream of a general area of the pool or spa 602, thereby generating a stream of video data. The camera 622 may send the stream of video data to any of the controller 614, the user devices 624, and the remote servers 620, such that the video data may be viewed immediately (e.g., on an electronic display of one of the user devices 624) or stored in a memory of a receiving device for later viewing. The camera 622 may be activated by a command received from the controller 614 or one of the remote servers 620 via the gateway 604. For example, the camera 622 may be instructed to activate in response to the splash detector 605 detecting that something has entered the pool or spa 602 so that the user may view a live feed of the pool or spa 602 for determining what or who has entered the pool or spa 602 and respond accordingly.

The one or more temperature sensors 632 may sense any temperature associated with the pool or spa 602, such as a water temperature, an ambient temperature of air around the pool or spa 602, a temperature of the ground around the pool or spa 602, or any other temperature relevant to operation of the pool or spa 602. The temperature sensors 632 can send the temperatures sensed to the controller 614 or the user devices 624 as described above. As such, the user can remotely monitor the temperatures and send commands to control the temperatures using the controller 614 or the user devices 624. The user may set a target temperature of the pool or spa 602, and the controller 614 can selectively activate the heater 610 accordingly in order to maintain the target temperature. The controller 614 can use a temperature control process known in the art. For example, the controller 614 may turn on the heater 610 when one or more of the temperatures sensed are too low. Additionally or alternatively, the controller 614 may turn off the heater 610 when one or more of the temperatures sensed are too high. Additionally or alternatively, the controller 614 may automatically control the heater 610 based on one or more of the temperatures sensed by the one or more temperature sensors 632. For example, the controller 614 may control the heater 610 to maintain a predetermined vacation mode temperature, which can be selected to allow the heater 610 to operate efficiently while users are not using the pool or spa 602.

In some embodiments, the remote servers 620 may host or retrieve weather data (e.g., from internet-accessible dedicated weather servers), including the weather data for a local region (e.g., city, county, zip-code, or state) in which the system 600 is located. This weather data may include meteorological predictions (e.g., across several days/weeks) and live readings of temperature and weather for the local region. In some embodiments, some or all of the weather data for the local region hosted or retrieved by the remote servers 620 may be transmitted to the controller 614 via the gateway 604 and the network 618. As described herein, the remote servers 620 or the controller 614 may analyze the weather data and, based on this analysis, control the network-enabled devices of the system 600.

The gateway 604 (e.g., the base station, router, or gateway 320 of FIG. 3), may include a base station or a router, and the network 618 may include a LAN, a WAN, or the internet. The gateway 604 may route data (e.g., commands, messages, sensor data, profile data, alerts, or other applicable information) locally between the network-enabled devices of the system 600 that are in direct communication with the gateway 604 and globally between local devices and remote devices via the network 618. One or more of the user devices 624 and one or more of the remote servers 608 may be communicatively coupled to the gateway 604 via the network 618. The user devices 644 may include personal computers, tablets, smart phones, etc. In some embodiments, a home automation device 636 may be coupled to the gateway 604. The home automation device 636 can be an Amazon Echo or Google Home, or other hub device. The home automation device 636 may receive commands and relay the commands to the controller 614, the remote servers 620, and/or the user devices 624 via the gateway 604. In some embodiments, at least some IoT devices and/or connected devices, including the chemical controller 612, the pump 608, the heater 610, the camera 622, the splash detector 605, the motion detector 606, the alarms 626, the chemical sensors 630, the temperature sensors 632, or water features 634, may be network-enabled devices that can communicatively couple to the gateway 604.

The controller 614 may be implemented as a network-enabled device in or around a home or a business. In one embodiment, the controller 614 may be a central control hub, which may include a processor, volatile and non-volatile memory, a HMI, and network interface circuitry. The controller 614 or the remote servers 620 may communicate with the controller 614 to control and/or monitor at least some IoT devices and/or connected devices, including the chemical controller 612, the pump 608, the heater 610, the camera 622, the splash detector 605, the motion detector 606, the alarms 626, the chemical sensors 630, the temperature sensors 632, or the water features 634, automatically or in response to manual user commands (e.g., provided at the HMI of the controller 614 or by one of the user devices 624).

The controller 614 may record data related to operation of the pool or spa 602 in order to assist the user in maintaining the pool or spa 602. Additionally or alternatively, the controller 614 may relay the data to the remote servers 620 for processing. Then, the remote servers 620 or the controller 614 may send a notification to one or more of the user devices 624 in response to the data. For example, the controller 614 may track a number of hours the pump 608 or the heater 610 has run since installation. Then, when the number hours has reached a predetermined threshold, such as 2000 hours of runtime for the pump 608, the remote servers 620 and/or the controller 614 may send a notification to one or more of the user devices 624 with instructions to check the pump 608. The controller 614 may track the number of hours the pump 608 has run since a filter in the filtration unit 609 has been installed. Then, when the number of hours has reached a predetermined threshold, such as 1000 hours of runtime for the pump 608 since the filter in the filtration unit 609 was installed, the remote servers 620 and/or the controller 614 may send a notification to one or more of the user devices 624 with instructions to change the filter 609.

Figure 7:
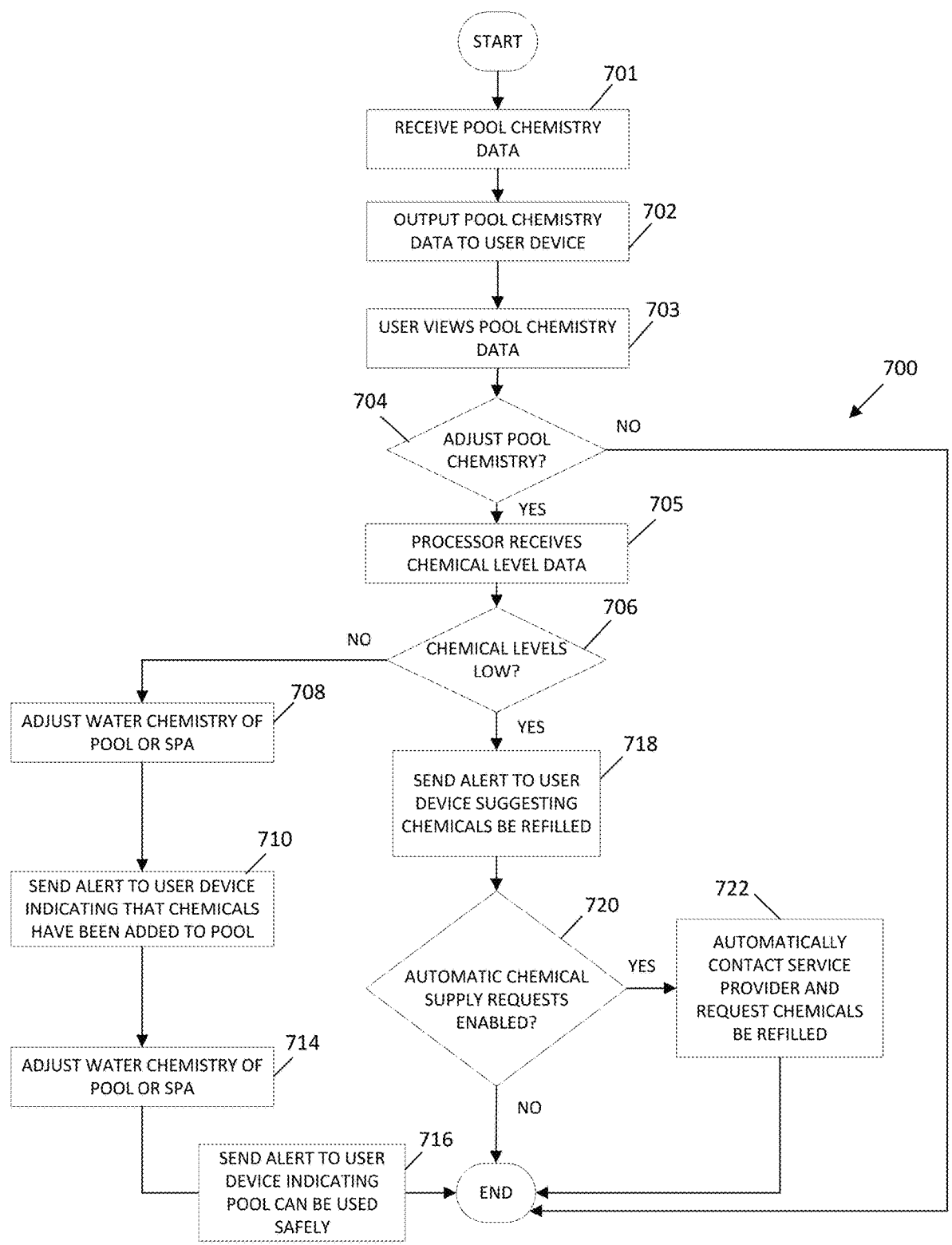
FIG. 7 is a flow chart of an example method by which levels of chemicals of a chemical controller for a pool or a spa may be determined by a processor of a controller in accordance with various embodiments.

FIG. 7 illustrates an example method 700 by which a user may add chemicals to a pool (e.g., the pool or spa 602 of FIG. 6) using a user device (e.g., one of the user devices 624 of FIG. 6). The pool may be in fluid contact with a chemical controller (e.g. the chemical controller 612 of FIG. 6) and/or a chemical sensor (e.g. the chemical sensor 630 of FIG. 6). The chemical controller and/or the chemical sensor may be coupled to a processor of a controller (e.g. the controller 614 of FIG. 6). A gateway (e.g. the gateway 604 of FIG. 6) may be coupled to the processor of the controller. A network (e.g. the network 618 of FIG. 6) may be coupled to the gateway, the user device, and/or a remote server (e.g. one of the remote servers 620 of FIG. 6). If the processor determines that levels of the chemical are low, a home or business owner may be alerted to a need to refill the chemicals of the chemical controller and, optionally, a chemical supply service may automatically be contacted to refill the chemicals. The processor may perform the method 700 by executing computer-readable instructions stored on a memory device of the controller.

At step 701, the controller can receive pool chemistry data from the chemical controller or the chemical sensor. The pool chemistry data can be sensed by the chemical controller or the chemical sensor. The pool chemistry data can include pH levels or chlorine levels of the pool. The method 700 can then progress to step 702.

At step 702, the controller can output the pool chemistry data to the user device. The controller can communicate with the gateway, the network, and/or the remote server to output the pool chemistry data to the user device. The method 700 can then progress to step 703.

At step 703, a user of the user device can view the pool chemistry data on the user device. For example, a pool management software application installed on the user device may display a graphical user interface including the pool chemistry data reported from the controller. The user device can receive the pool chemistry data from the gateway, the network, and/or the remote server. The user can also view a standard pool chemistry profile of his or her pool, which can be preconfigured or user selected. The standard pool chemistry profile can include ideal pH levels or chlorine levels of the pool. The method 700 can then progress to step 704.

At step 704, the user can select whether to adjust a pool chemistry of the pool. A selection of whether or not to adjust the pool chemistry can be received by the controller from the user device and can include a preconfigured amount or user selected amount of chemicals to add to the pool. If the user selects no adjustment to the pool chemistry ("NO" at step 704), then the method 700 can end. However, if the user selects to adjust the pool chemistry ("YES" at step 704), then the method 700 can proceed to step 705.

At step 705, the processor can request and receive chemical level data from the chemical controller. The chemical level data may, for example, include amounts of chemicals (e.g., chlorine and acid) stored in containers coupled to the chemical controller 612 and as detected by level sensors or weight sensors disposed at the containers. The method 700 can then proceed to step 706.

At step 706, the processor can determine whether chemical levels in the chemical controller are low based on the chemical level data. For example, if an amount of chlorine in one of the containers is determined by the processor to be lower than a predefined threshold, then the processor can determine that a chlorine level is low and that additional chlorine should be added to that one of the containers. Alternatively, this threshold determination may be made by the chemical controller, and the chemical level data may simply include one or more signals that may be sent to the processor to indicate whether the chemical levels are low. If the chemical levels are not low ("NO" at step 706), then the method 700 can proceed to step 708. Otherwise, if the chemical levels are low ("YES" at step 706), then the method 700 can proceed to step 718.

At step 708, the processor can instruct the chemical controller to adjust a water chemistry of the pool. In some embodiments, this adjustment may include the chemical controller adding chlorine or a mixture of the chlorine and calcium hypochlorite to the pool. In some embodiments, this adjustment may include the chemical controller adding algaecide to the pool. In some embodiments, this adjustment may include the chemical controller adding the chlorine or a mixture of the chlorine, the calcium hypochlorite, and the algaecide to the pool. The method 700 can then proceed to step 710.

At step 710, the processer can cause an alert to be sent (e.g., via the gateway 604 and/or network 618 of FIG. 6) to the user device (e.g., one of the user devices 624 of FIG. 6) indicating that chemicals have been added to the pool by the chemical controller. This alert may include a type and an amount of the chemicals added. For example, the alert may include a push notification sent by the processor to a software application running on the user device, a simple messaging service (SMS) message, or any other applicable text or voice alert capable of being output by the user device(s). The alert may inform the user of the user device that the pool should not be used for a predetermined amount of time subsequent to an oversaturation of the pool with the chlorine. The method 700 can then proceed to step 714.

At step 714, the processor can instruct the chemical controller to adjust the water chemistry of the pool. The chemical controller may rebalance the chemical levels in the pool after a predetermined amount of time has passed since oversaturating the pool with the chlorine or the mixtures thereof. This process may rebalance the chemical levels in the pool until a desired pool chemistry profile, (e.g. a target Ph level or chlorine level) is reached. The method 700 can then progress to step 716.

At step 716, the processer can cause an alert to be sent (e.g., via the gateway 604 and/or the network 618 of FIG. 6) to the user device indicating that the pool can be used safely. The method 700 can then end.

At step 718, in response to detecting low chemical levels, the processer can cause an alert to be sent to (e.g., via the gateway 604 and/or the network 618 of FIG. 6) to the user device (e.g., one of the user devices 624 of FIG. 6) indicating that a supply of the chemicals of the chemical controller should be refilled. This alert may include a type and an amount of the chemicals that need to be refilled.

At step 720, the processor can determine whether automatic chemical supply requests have been enabled. For example, the automatic chemical supply requests may be enabled by changing settings through a user interface of the controller or the user device. If the automatic chemical requests are enabled, then the method 700 can proceed to step 722. Otherwise, the method 700 can end.

At step 722, the processor can retrieve service provider information (e.g., for a chemical supply service) from a local or remote memory and contact a corresponding service provider based on the service provider information. The service provider information may be defined by the user when enabling the automatic chemical supply requests and may include at least a phone number or an e-mail address of the corresponding service provider and, optionally, a title and an address of the corresponding service provider and user-provided payment information. For example, the processor may cause a text message or an e-mail to be sent to the corresponding service provider or may call the corresponding service provider and play an automated message in order to request that a repair be scheduled. In some embodiments, the corresponding service provider may confirm a scheduling of a resupply of the chemicals of the chemical controller for a particular time and date, and in response, the processor may send a text-based alert to the user device in order to inform the user of the particular time and date of the repair as scheduled. The method 700 can then end.

Figure 8:
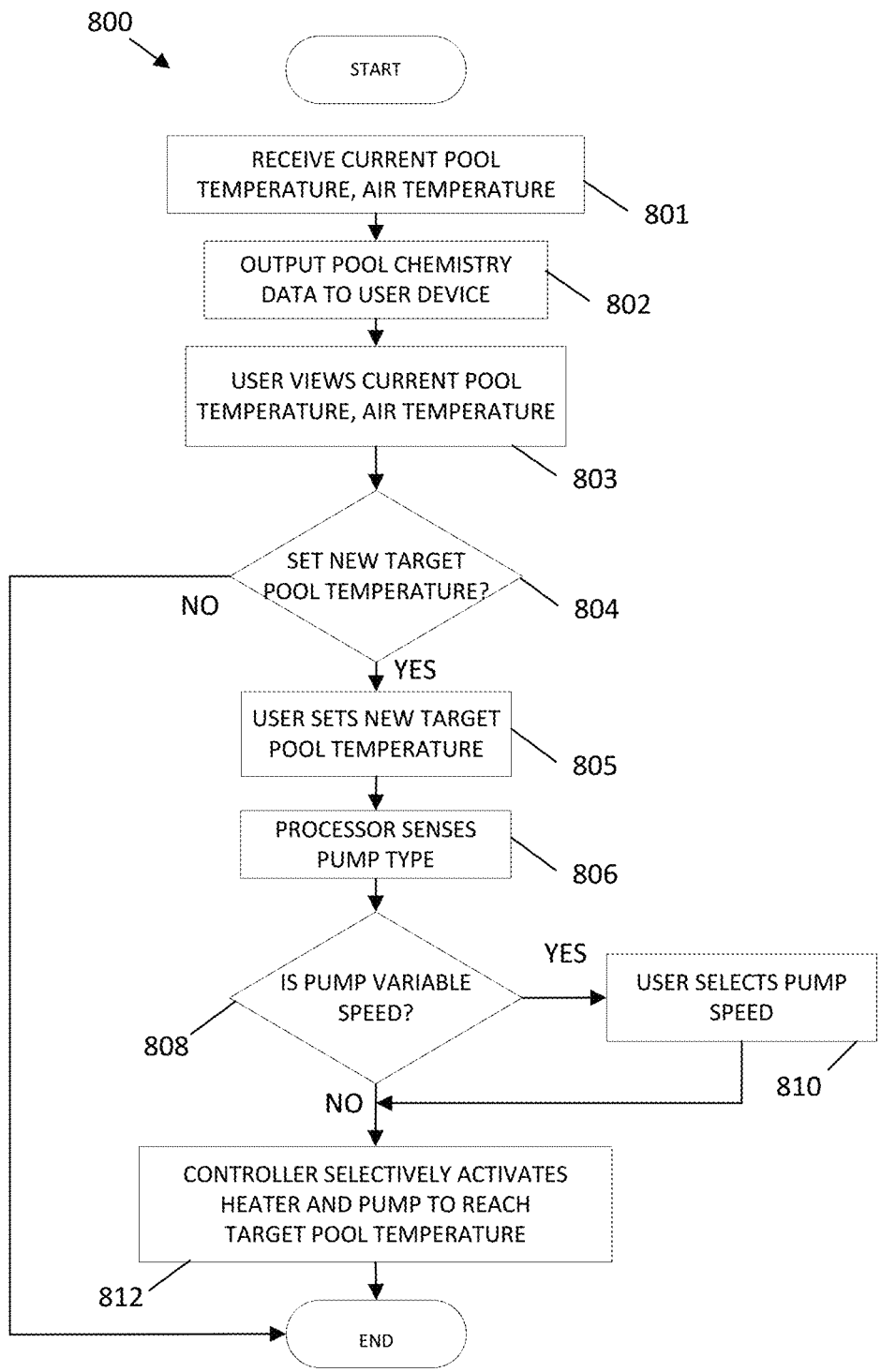
FIG. 8 is a flow chart of an example method by which a target pool temperature is set for a pool in accordance with various embodiments.

FIG. 8 illustrates an example method 800 by which a new target pool temperature of a pool (e.g., the pool or spa 602 of FIG. 6) can be set by a user using a user device (e.g., one of the user devices 624 of FIG. 6). The pool may be in fluid contact with a first temperature sensor (e.g. the one or more temperature sensors 632 of FIG. 6), a heater (e.g. the heater 610 of FIG. 6), and/or a pump (e.g. the pump 608 of FIG. 6). A second temperature sensor (e.g. the one or more temperature sensors 632 of FIG. 6) may sense an ambient air temperature around the pool. The first and second temperature sensors, the heater, and/or the pump may be coupled to a processor of a controller (e.g. the controller 614 of FIG. 6). The processor may perform the method 800 by executing computer-readable instructions stored on a memory device of the controller.

At step 801, the controller can receive one or more temperature values from the first temperature sensor and/or the second temperature sensor. The method 800 can then progress to step 802.

At step 802, the controller can output the one or more temperature values to the user device. A gateway (e.g. the gateway 604 of FIG. 6) may be coupled to the processor of the controller. A network (e.g. the network 618 of FIG. 6) may be coupled to the gateway, the user device, and/or a remote server (e.g. one of the remote servers 620 of FIG. 6). The controller can communicate with the gateway, the network, and/or the remote server to output the one or more temperature values to the user device. The method 800 can then progress to step 803.

At step 803, the user can view the one or more temperatures values on the user device. The user device may receive the one or more temperature values from the gateway, the network, and/or the remote server. The user may also view a current target pool temperature, which can be a target temperature the user wants the pool to reach. A pool management software application installed on the user device may display a graphical user interface including the one or more temperature values reported from the controller and/or the current target pool temperature. The method 800 can then proceed to step 804.

At step 804, the user can decide whether to set a new target pool temperature on the user device. If the user decides to set the new target pool temperature ("YES" at step 804), then the method 800 can proceed to step 805. If the user opts to not set the new target pool temperature ("NO" at step 804), then the method 800 can end.

At step 805, the user can set the new target pool temperature on the user device. The new target pool temperature may be selected by the user based on the one or more temperatures values sensed in step 801. The new target pool temperature may be received by the remote server from the user device. The processor may then receive the new target pool temperature from the remote server. The method 800 can then proceed to step 806.

At step 806, the processor can sense a pump type of the pump, such as a single speed pump or a variable speed pump. The method 800 can then progress to step 808.

At step 808, if the processor sensed that the pump is the variable speed pump ("YES" at step 808), then the method 800 can progress to step 810. If the processor sensed that the pump is not the variable speed pump ("NO" at step 808), then the method 800 can progress to step 812.

At step 810, the user can select a pump speed on the user device and/or a desired flow rate on the user device. The processor may identify a minimum acceptable pump speed in order to assure the heater functions properly and/or does not overheat. The processor may also identify a minimum acceptable flow rate. The pump speed and/or the desired flow rate may be received by the remote server from the user device. The processor may then receive the pump speed and/or the desired flow rate from the remote server. The process 800 can then progress to step 812.

At step 812, the processor can selectively activate the heater and/or the pump in order to heat or cool the pool to the new target pool temperature. When the pump is running, the pump can protect the heater from overheating. The pump may function at least during a portion of time the heater is activated. The pump may also function for at least a time period following a period of time when the heater is activated. The pump may function at any time when the heater is at risk of overheating. If the pump is the single speed pump, then the processor may turn the pump on and off as necessary. If the pump is the variable speed pump, then the processor may run the pump at the pump speed and/or at the desired flow rate selected by the user in step 810 in order to control a flow of the pump.

Figure 9A:
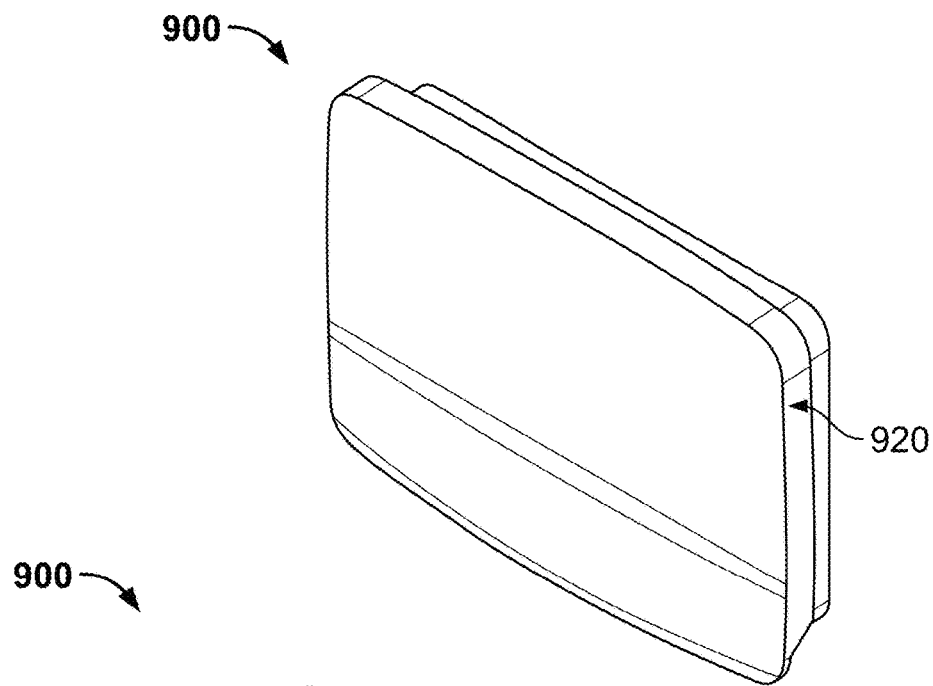
FIG. 9A is an isometric view of an example IoT device in accordance with various embodiments.
Figure 9B:
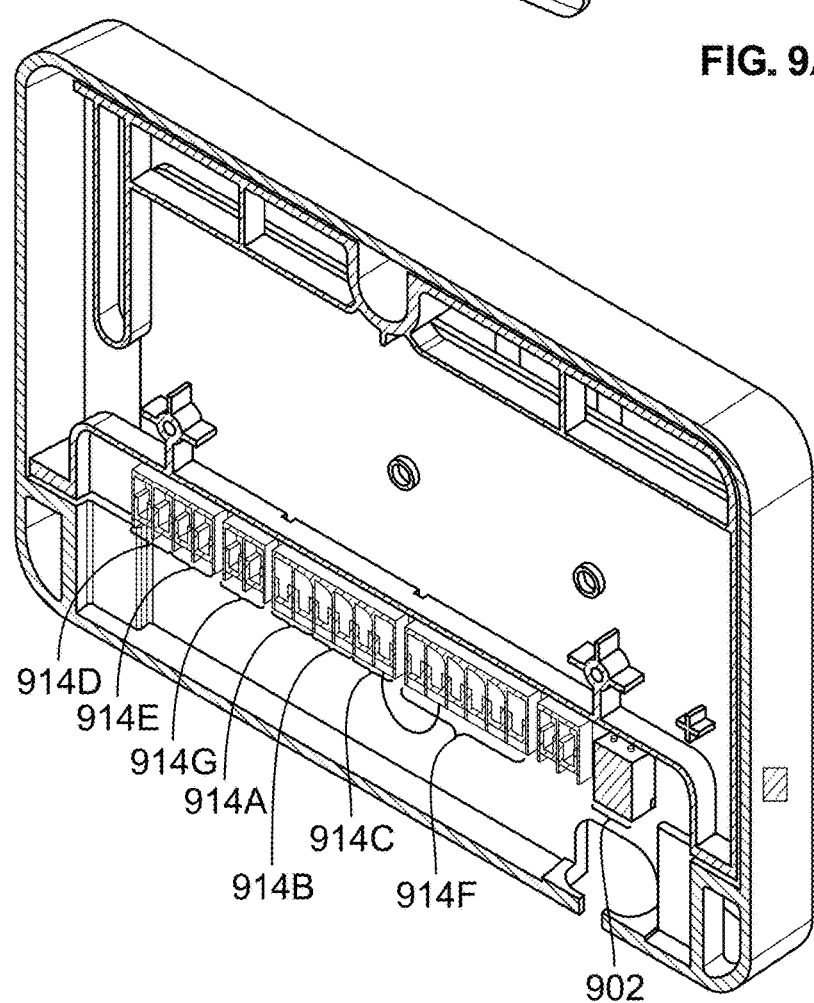
FIG. 9B is an isometric view of the example IoT device of FIG. 9A with a front cover removed therefrom.

FIG. 9A illustrates a perspective view and FIG. 9B illustrates a cutaway perspective view of an IoT device 900 (e.g., one of the IoT devices 404 of FIG. 4) in accordance with various embodiments of the invention. The IoT device 900 can include an input 902 for a power supply. The IoT device 900 can include one or more control interfaces 914A, 914B, 914C, 914D, 914E, 914F, 914G. The control interfaces 914A, 914B, 914C C can be two wire ports for connecting to temperature sensors, such as thermistors. The control interfaces 914D, 914E can be RS-485 ports for communicating with a variety of devices as described above. The control interface 914F can be a 6 pin digital output for communicating with a pump. The control interface 914G can be a fireman's switch.

The IoT device 900 may have a cover 920. The cover 920 can protect electrical connections of the IoT device and/or hide the electrical connections for improved aesthetics. The cover 920 may be removed to access an HMI, including status lights (e.g. the one or more status lights 250 of FIG. 2A) and/or a multi-function service button. The cover 920 may extend over the IoT device 900 in order to provide a substantially or entirely waterproof housing for the electrical connections and/or a microcontroller.

Figure 10:
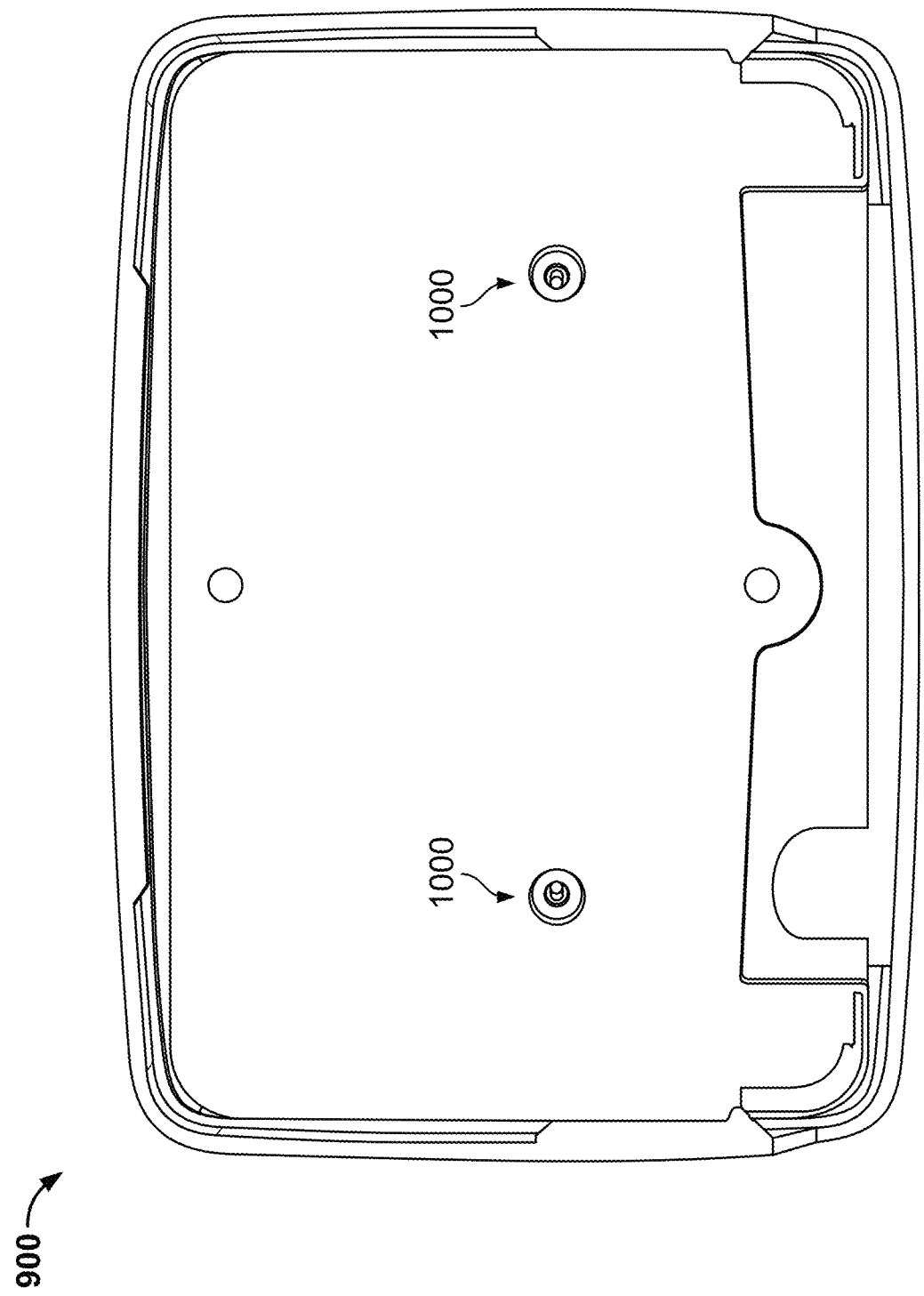
FIG. 10 is a rear elevational view of the example IoT device of FIG. 9A and FIG. 9B.

FIG. 10 illustrates a rear view of the IoT device 900 of FIG. 9A and FIG. 9B. A backside of the IoT device 900 may include one or more mounting points 1000. The mounting points 1000 may be used to attach the IoT device 900 to a post or a wall as described above.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A method of remotely monitoring and controlling a pool controller for a pool or a spa, the method comprising:
   receiving pool chemistry data from a chemical controller or a chemical sensor;
   outputting the pool chemistry data to a user device;
   receiving a selection to adjust a chemistry comprising a chemical level in the pool or the spa from the user device;
   receiving chemical level data from the chemical controller,
   determining whether the chemical level in the pool or the spa is low based on the chemical level data;
   automatically instructing the chemical controller to adjust the chemical level in the pool or the spa when the chemical level is determined to be low;
   increasing the chemical level in the pool or the spa via the chemical controller in response to the instruction;
   sending a first alert to the user device indicating that chemicals have been added to the pool or the spa; and
   sending a second alert to the user device indicating that the pool or the spa can be used safely.

2. The method of claim 1 further comprising:
   requesting the chemical level data from the chemical controller prior to receiving the chemical level data from the chemical controller.

3. The method of claim 1 further comprising:
   automatically rebalancing the chemistry of the pool or the spa via the chemical controller.

4. The method of claim 3 further comprising:
   automatically rebalancing the chemistry of the pool or the spa via the chemical controller a predetermined period of time after instructing the chemical controller to increase the chemical level of the pool or the spa.

5. The method of claim 4 further comprising:
   sending the second alert to the user device after the chemical controller automatically rebalances the chemistry of the pool or the spa.

6. The method of claim 1 further comprising:
   when the chemical level in the chemical controller is low, sending a low chemical alert to the user device.

7. The method of claim 6 further comprising:
   determining whether an automatic chemical supply request has been enabled;
   retrieving service provider information based on said automatic chemical supply request; and
   contacting a corresponding service provider based on the service provider information.

8. The method of claim 1 further comprising:
   communicating with a gateway, a network, and/or a remote server to output the pool chemistry data to the user device.

9. The method of claim 1 further comprising:
   communicating with a gateway or a network to send the first alert to the user device and to send the second alert to the user device.

10. A method of remotely monitoring and controlling a pool controller for a pool or a spa, the method comprising:
    receiving a temperature value from a temperature sensor;
    outputting the temperature value to a user device;
    receiving a new target pool temperature from the user device;
    selectively activating a heater and/or a pump in order to heat or cool the pool or the spa to the new target pool temperature;
    determining whether a pump type of the pump is single speed or variable speed; and
    operating the pump according to the pump type and the new target pool temperature.

11. The method of claim 10, wherein the temperature sensor is configured to measure an ambient temperature value around the pool or the spa.

12. The method of claim 10, wherein the temperature sensor is in fluid contact with the pool or the spa.

13. The method of claim 10, wherein:
    the determined pump type of the pump is single speed; and
    the method further comprises selectively activating the pump by turning the pump on and off as a result of the determined pump type.

14. The method of claim 10, wherein:
    the determined pump type of the pump is variable speed; and
    the method further comprises:
    receiving a pump speed from the user device in response to the determined pump type; and
    selectively activating the pump to run at the pump speed when the pump type is variable speed.

15. The method of claim 14 further comprising:
    receiving the pump speed from the user device via a remote server.

16. The method of claim 10, wherein:
    the determined pump type of the pump is variable speed; and
    the method further comprises:
    receiving a desired flow rate from the user device in response to the determined pump type; and
    selectively activating the pump to run at the desired flow rate.

17. The method of claim 16 further comprising:
    receiving the desired flow rate from the user device via a remote server.

18. The method of claim 10 further comprising:
    communicating with a gateway, a network, and/or a remote server to output the temperature value to the user device.

19. The method of claim 10 further comprising:
    receiving the new target pool temperature from the user device via a remote server.

* * * * *